US012614315B2

(12) United States Patent
Akhtar et al.

(10) Patent No.: US 12,614,315 B2
(45) Date of Patent: Apr. 28, 2026

(54) ATTRIBUTE CODING FOR POINT CLOUD COMPRESSION

(71) Applicant: QUALCOMM Incorporated, San Diego, CA (US)

(72) Inventors: Anique Akhtar, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/490,467

(22) Filed: Oct. 19, 2023

(65) Prior Publication Data

US 2024/0135596 A1    Apr. 25, 2024
US 2024/0233196 A9    Jul. 11, 2024

Related U.S. Application Data

(60) Provisional application No. 63/380,522, filed on Oct. 21, 2022.

(51) Int. Cl.
*G06T 9/00*        (2006.01)

(52) U.S. Cl.
CPC .................................. *G06T 9/002* (2013.01)

(58) Field of Classification Search
None
See application file for complete search history.

(56) References Cited

U.S. PATENT DOCUMENTS

2024/0054685 A1*    2/2024    Yuan ......................... G06T 3/06
2024/0155157 A1*    5/2024    Park ..................... H04N 19/184
(Continued)

FOREIGN PATENT DOCUMENTS

EP        4068213 A2    10/2022

OTHER PUBLICATIONS

Akhtar A., et al., "[AI-3DGC][EE5.3-related] Baseline Attribute Compression for ML Based PCC", 140. MPEG Meeting; Oct. 24, 2022-Oct. 28, 2022, Mainz, (Motion Picture Expert Group or ISO/IEC JTC1/SC29/WG11), m61313, Mainz, 23 Pages, XP03030587, Oct. 23, 2022, the whole document.
(Continued)

*Primary Examiner* — James A Thompson
(74) *Attorney, Agent, or Firm* — QUALCOMM Incorporated; Espartaco Diaz Hidalgo

(57)        ABSTRACT

A method of encoding point cloud data includes receiving, for a first encoding process, geometry data of the point cloud data of a source point cloud; encoding, in accordance with the first encoding process, the geometry data to generate encoded geometry data of a target point cloud and a geometry bitstream; decoding the encoded geometry data to generate reconstructed geometry data; performing an attribute recomputing process on attribute data of the point cloud data of the source point cloud based on the reconstructed geometry data to generate recomputed, reconstructed point cloud data of the target point cloud; and encoding, in accordance with a second encoding process, the recomputed, reconstructed point cloud data to generate an attribute bitstream.

44 Claims, 11 Drawing Sheets

(56) References Cited

U.S. PATENT DOCUMENTS

2025/0022183 A1* 1/2025 Lasserre .................. G06T 7/251
2025/0086842 A1* 3/2025 Han ..................... G06V 40/103

OTHER PUBLICATIONS

Akhtar A., et al., "[AI-3DGC][EE5.3-related] Update on Baseline Attribute Compression for ML-Based PCC", 141. MPEG Meeting; Jan. 16, 2023-Jan. 20, 2023, Online, (Motion Picture Expert Group or, ISO/IEC JTC1/SC29/WG11), No. m62180, Jan. 18, 2023, 14 Pages XP030308006, the whole document.

Alexiou E., et al., "Towards Neural Network Approaches for Point Cloud Compression", SPIE Proceedings, US, vol. Separately 11510, Aug. 21, 2020, pp. 1151008-1151008, XP060133709, 20 pages, abstract, section 4.2.

Guarda A.F.R., et al., "Point Cloud Geometry and Color Coding in a Learning-Based Ecosystem for Jpeg Coding Standards", 2023 IEEE International Conference on Image Processing (ICIP), Oct. 8, 2023, pp. 2585-2589, XP034468182, the whole document.

International Search Report and Written Opinion—PCT/US2023/077438—ISA/EPO—Feb. 14, 2024 15 pp.

Lazzarotto D., et al., "Integrated Learning-based Point Cloud Compression for Geometry and Color with Graph Fourier Transforms", Proceedings of SPIE, US vol. 12226, Oct. 3, 2022, pp. 122260U-122260U, XP060166768, pp. 1-15, the whole document.

Zaghetto A., et al., "[AI-GC][EE 5.3-related][New] Hybrid AI-based Geometry + V-PCC Attribute Coding", 142. MPEG Meeting, Apr. 24, 2023-Apr. 28, 2023, Antalya, (Motion Picture Expert Group or ISO/IEC JTC/SC29/WG11), No. m62678, Apr. 19, 2023, 9 Pages, XP030309750, the whole document.

Github: "MPEGGroup/mpeg-pcc-tmc13", Accessed on Oct. 21, 2022, pp. 1-3.

Github: "MPEGGroup/mpeg-pcc-tmc2", Accessed on Oct. 21, 2022, pp. 1-8.

Graziosi D., et al., "An Overview of Ongoing Point Cloud Compression Standardization Activities: Video-Based (V-PCC) and Geometry-Based(G-PCC)", Industrial Technology Advances, SIP, vol. 9, No. e13, Apr. 2020, pp. 1-17.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Schwarz S., et al., "Emerging MPEG Standards for Point Cloud Compression", IEEE Journal on Emerging and Selected Topics in Circuits and Systems, Piscataway, NJ, USA, vol. 9, No. 1, Mar. 30, 2019, pp. 133-148, XP011714044, ISSN: 2156-3357, Sections II-VII and IX.

* cited by examiner

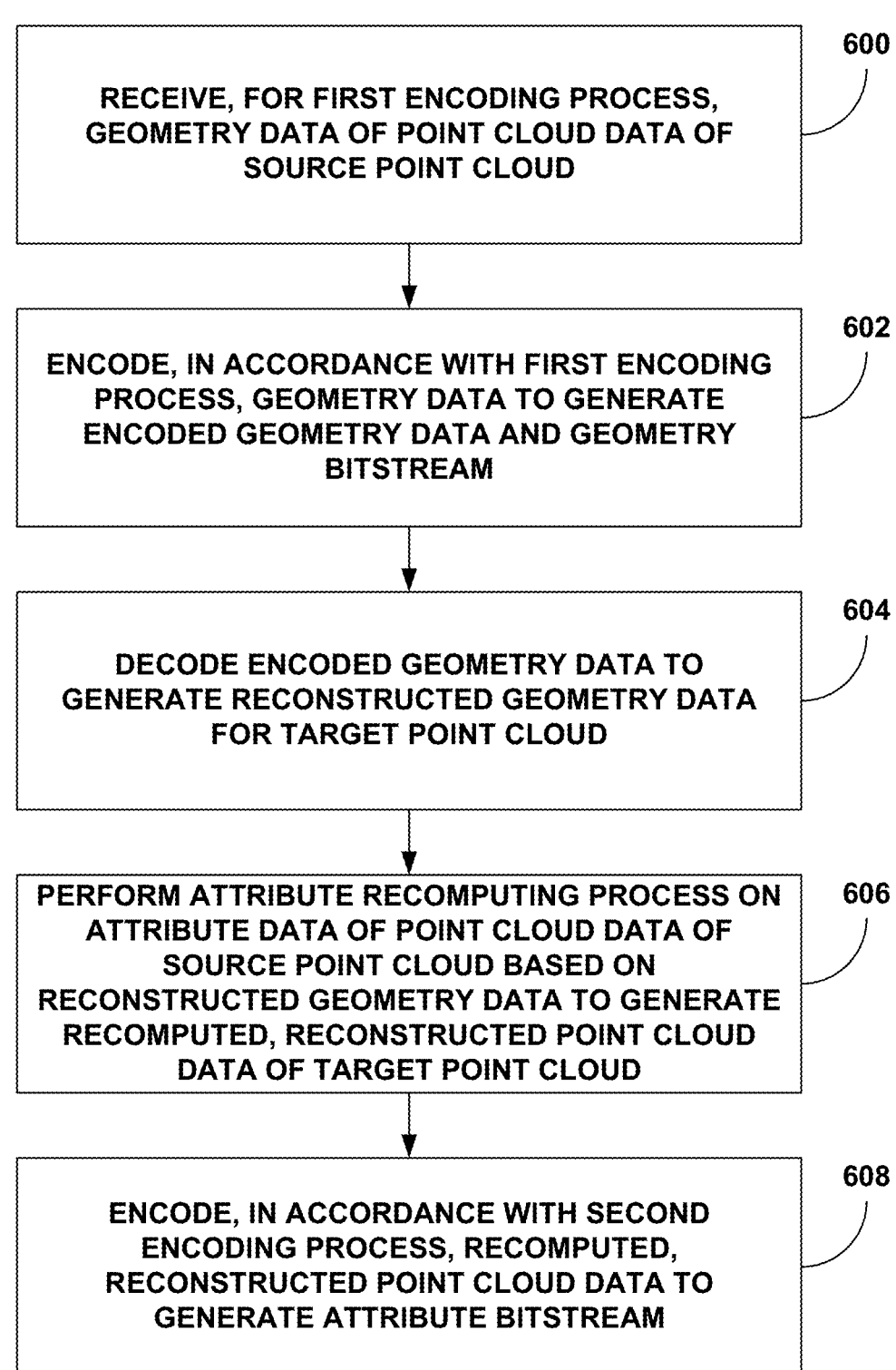

RECEIVE, FOR FIRST ENCODING PROCESS, GEOMETRY DATA OF POINT CLOUD DATA OF SOURCE POINT CLOUD

600

ENCODE, IN ACCORDANCE WITH FIRST ENCODING PROCESS, GEOMETRY DATA TO GENERATE ENCODED GEOMETRY DATA AND GEOMETRY BITSTREAM

602

DECODE ENCODED GEOMETRY DATA TO GENERATE RECONSTRUCTED GEOMETRY DATA FOR TARGET POINT CLOUD

604

PERFORM ATTRIBUTE RECOMPUTING PROCESS ON ATTRIBUTE DATA OF POINT CLOUD DATA OF SOURCE POINT CLOUD BASED ON RECONSTRUCTED GEOMETRY DATA TO GENERATE RECOMPUTED, RECONSTRUCTED POINT CLOUD DATA OF TARGET POINT CLOUD

606

ENCODE, IN ACCORDANCE WITH SECOND ENCODING PROCESS, RECOMPUTED, RECONSTRUCTED POINT CLOUD DATA TO GENERATE ATTRIBUTE BITSTREAM

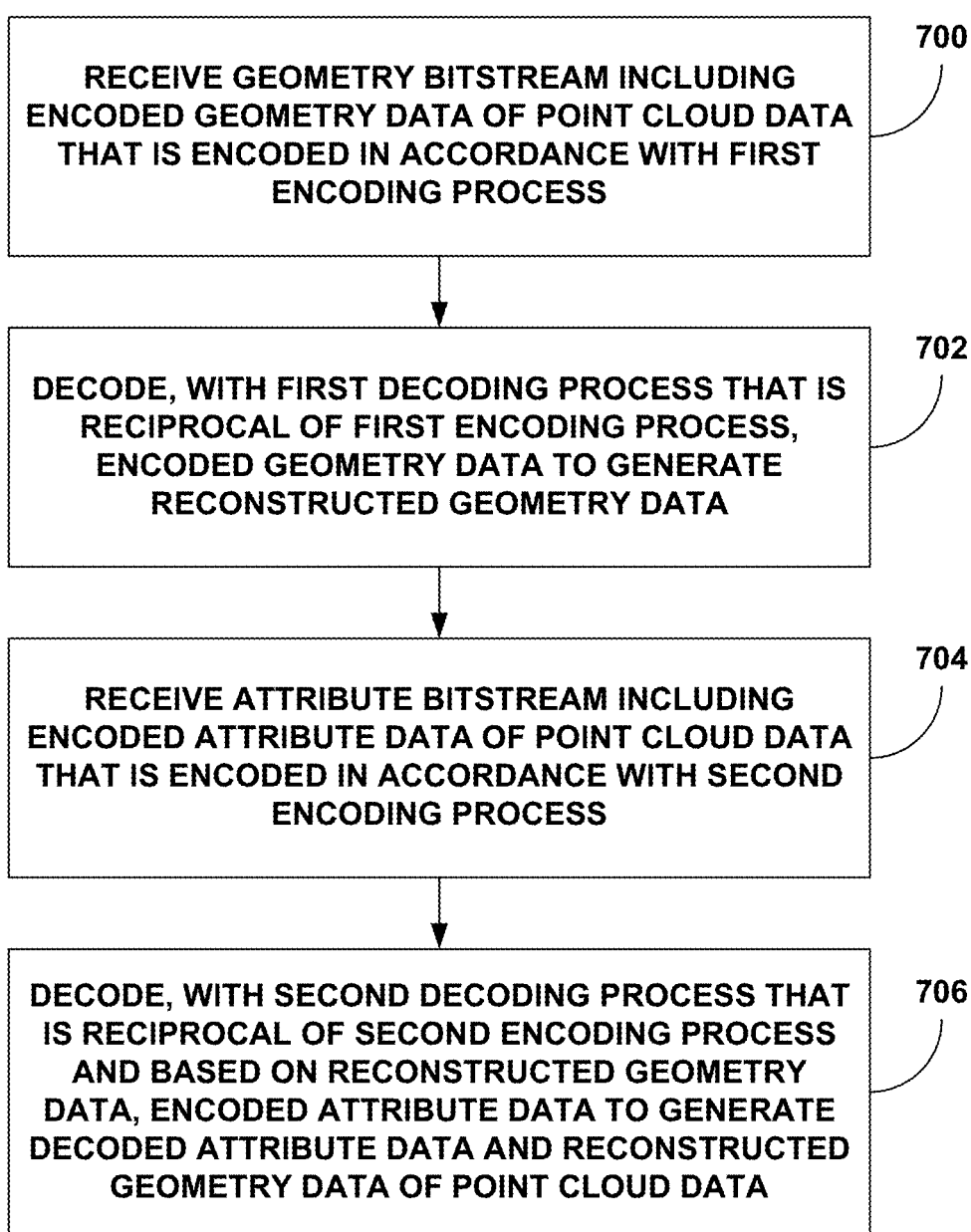

RECEIVE GEOMETRY BITSTREAM INCLUDING ENCODED GEOMETRY DATA OF POINT CLOUD DATA THAT IS ENCODED IN ACCORDANCE WITH FIRST ENCODING PROCESS

700

DECODE, WITH FIRST DECODING PROCESS THAT IS RECIPROCAL OF FIRST ENCODING PROCESS, ENCODED GEOMETRY DATA TO GENERATE RECONSTRUCTED GEOMETRY DATA

702

RECEIVE ATTRIBUTE BITSTREAM INCLUDING ENCODED ATTRIBUTE DATA OF POINT CLOUD DATA THAT IS ENCODED IN ACCORDANCE WITH SECOND ENCODING PROCESS

704

DECODE, WITH SECOND DECODING PROCESS THAT IS RECIPROCAL OF SECOND ENCODING PROCESS AND BASED ON RECONSTRUCTED GEOMETRY DATA, ENCODED ATTRIBUTE DATA TO GENERATE DECODED ATTRIBUTE DATA AND RECONSTRUCTED GEOMETRY DATA OF POINT CLOUD DATA

ATTRIBUTE CODING FOR POINT CLOUD COMPRESSION

This application claims the benefit of U.S. Provisional Application No. 63/380,522, filed Oct. 21, 2022, the entire contents of which are hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for geometry data coding (e.g., encoding or decoding) and attribute data coding of point cloud data to leverage coding techniques efficient for each of geometry data and attribute data, while maintaining the correspondence (e.g., association) of the geometry data and attribute data. For instance, a first encoding process (e.g., machine learning-based coding techniques) for geometry data may be efficient, but the first encoding process may be less efficient for attribute data (or vice-versa). However, coding geometry data using the first encoding process (e.g., machine learning-based coding techniques), without accounting for the attribute data, can result in disconnect (e.g., disassociation) of the geometry data and the attribute data. With the example techniques described in this disclosure, different coding techniques for geometry data and attribute data are possible, while maintaining correspondence of the geometry data and the attribute data of the point cloud data.

The example techniques provide for a manner in which different encoding and decoding processes can be applied to geometry data and attribute data to provide better compression gains, while maintain corresponding of the geometry data and the attribute data. As an example, the example techniques may utilize learning-based geometry compression along with other compression schemes for attribute compression, use learning-based compression (e.g., different trained models) for both geometry and attribute compression, or use learning-based attribute compression along with other compression schemes for geometry compression. In this way, the example techniques improve the overall operation of point cloud encoding or decoding system with a practical application of enabling different encoding and decoding processes to geometry data and attribute data.

In one example, the disclosure describes a method of encoding point cloud data, the method comprising: receiving, for a first encoding process, geometry data of the point cloud data of a source point cloud; encoding, in accordance with the first encoding process, the geometry data to generate encoded geometry data and a geometry bitstream; decoding the encoded geometry data to generate reconstructed geometry data for a target point cloud; performing an attribute recomputing process on attribute data of the point cloud data of the source point cloud based on the reconstructed geometry data to generate recomputed, reconstructed point cloud data of the target point cloud; and encoding, in accordance with a second encoding process, the recomputed, reconstructed point cloud data to generate an attribute bitstream.

In one example, the disclosure describes a method of decoding point cloud data, the method comprising: receiving a geometry bitstream including encoded geometry data of the point cloud data that is encoded in accordance with a first encoding process; decoding, with a first decoding process that is reciprocal of the first encoding process, the encoded geometry data to generate reconstructed geometry data; receiving an attribute bitstream including encoded attribute data of the point cloud data that is encoded in accordance with a second encoding process; and decoding, with a second decoding process that is reciprocal of the second encoding process and based on the reconstructed geometry data, the encoded attribute data to generate decoded attribute data and reconstructed geometry data of the point cloud data.

In one example, the disclosure describes a system for encoding point cloud data, the system comprising: one or more memories configured to store point cloud data; and processing circuitry coupled to the one or more memories and configured to: receive, for a first encoding process, geometry data of the point cloud data of a source point cloud; encode, in accordance with the first encoding process, the geometry data to generate encoded geometry data and a geometry bitstream; decode the encoded geometry data to generate reconstructed geometry data for a target point cloud; perform an attribute recomputing process on attribute data of the point cloud data of the source point cloud based on the reconstructed geometry data to generate recomputed, reconstructed point cloud data of the target point cloud; and encode, in accordance with a second encoding process, the recomputed, reconstructed point cloud data to generate an attribute bitstream.

In one example, the disclosure describes a system for decoding point cloud data, the system comprising: one or more memories configured to store point cloud data; and processing circuitry coupled to the one or more memories and configured to: receive a geometry bitstream including encoded geometry data of the point cloud data that is encoded in accordance with a first encoding process; decode, with a first decoding process that is reciprocal of the first encoding process, the encoded geometry data to generate reconstructed geometry data; receive an attribute bitstream including encoded attribute data of the point cloud data that is encoded in accordance with a second encoding process; and decode, with a second decoding process that is reciprocal of the second encoding process and based on the reconstructed geometry data, the encoded attribute data to generate decoded attribute data and reconstructed geometry data of the point cloud data.

In one example, the disclosure describes a computer-readable storage medium storing instructions thereon that when executed cause one or more processors to: receive, for a first encoding process, geometry data of the point cloud data of a source point cloud; encode, in accordance with the first encoding process, the geometry data to generate encoded geometry data of a target point cloud and a geometry bitstream; decode the encoded geometry data to generate reconstructed geometry data; perform an attribute recomputing process on attribute data of the point cloud data of the source point cloud based on the reconstructed geometry data to generate recomputed, reconstructed point cloud data of the target point cloud; and encode, in accordance with a second encoding process, the recomputed, reconstructed point cloud data to generate an attribute bitstream.

In one example, the disclosure describes a computer-readable storage medium storing instructions thereon that when executed cause one or more processors to: receive a geometry bitstream including encoded geometry data of the point cloud data that is encoded in accordance with a first encoding process; decode, with a first decoding process that is reciprocal of the first encoding process, the encoded geometry data to generate reconstructed geometry data; receive an attribute bitstream including encoded attribute data of the point cloud data that is encoded in accordance with a second encoding process; and decode, with a second decoding process that is reciprocal of the second encoding process and based on the reconstructed geometry data, the encoded attribute data to generate decoded attribute data and reconstructed geometry data of the point cloud data.

The details of one or more examples are set forth in the accompanying drawings and the description below. Other features, objects, and advantages will be apparent from the description, drawings, and claims.

BRIEF DESCRIPTION OF DRAWINGS

FIG. 6 is a flowchart illustrating an example method of encoding point cloud data.

FIG. 7 is a flowchart illustrating an example method of decoding point cloud data.

FIG. 9 is a conceptual diagram illustrating an example vehicle-based scenario in which one or more techniques of this disclosure may be used.

DETAILED DESCRIPTION

Figure 1:
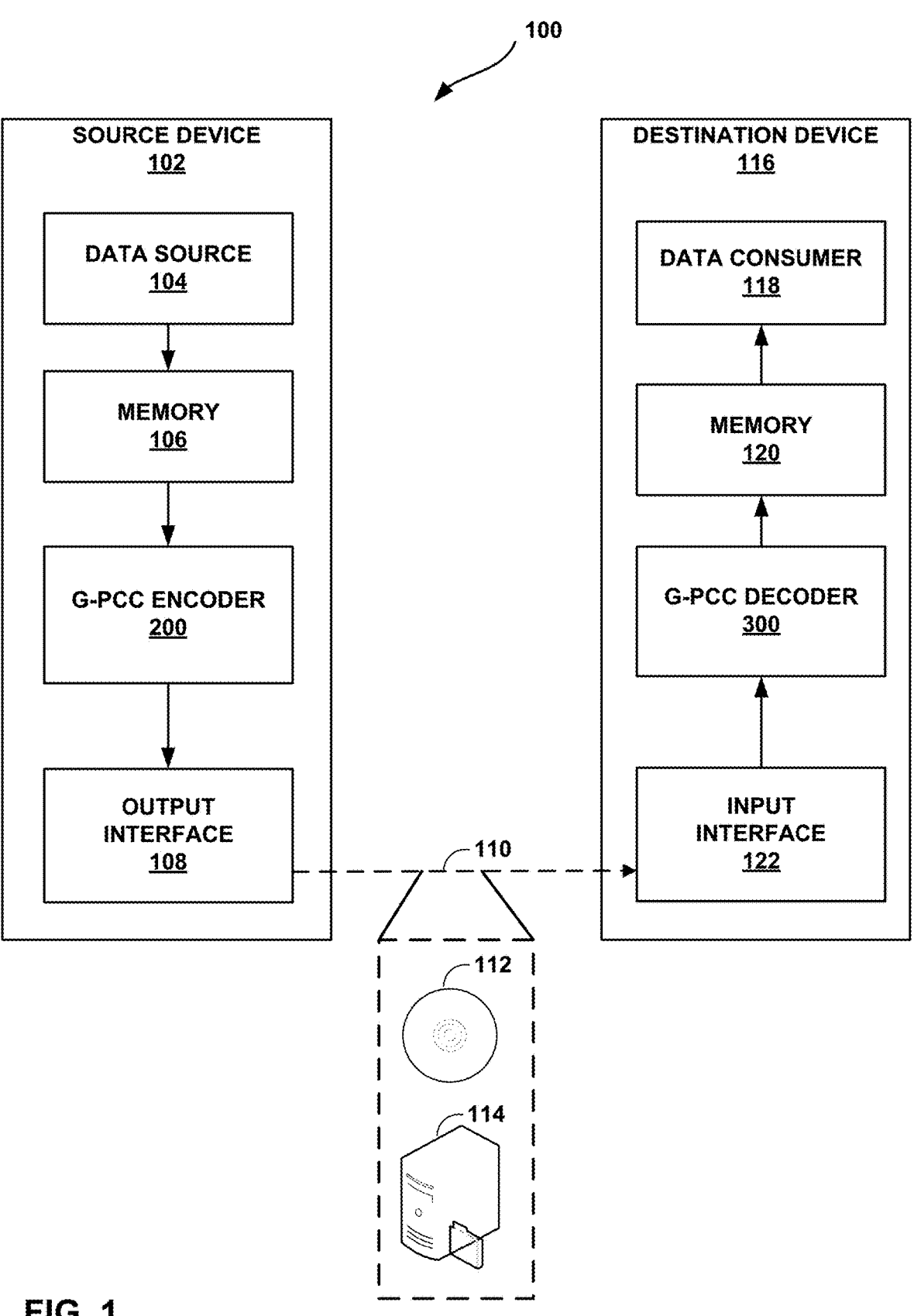
FIG. 1 is a block diagram illustrating an example encoding and decoding system that may perform the techniques of this disclosure.

A point cloud (PC) is a 3D data representation for tasks like virtual reality (VR) and mixed reality (MR), autonomous driving, etc. Point clouds are a set of points in 3D space, represented by their 3D coordinates (x, y, z) referred to as the geometry. Each point may also be associated with multiple attributes such as color, normal vectors, and reflectance. Depending on the target application and the PC acquisition methods, the PC can be categorized into point cloud scenes and point cloud objects. Point cloud scenes are typically captured using LiDAR sensors and are often dynamically acquired. Point cloud objects can be further subdivided into static point clouds and dynamic point clouds. A static PC is a single object, whereas a dynamic PC is a time-varying PC where each instance of a dynamic PC is a static PC. Dynamic time-varying PCs are used in AR/VR, volumetric video streaming, and telepresence and can be generated using 3D models, i.e., CGI, or captured from real-world scenarios using various methods such as multiple cameras with depth sensors surrounding the object. These PCs are dense photo-realistic point clouds that can have a massive number of points, especially in high precision or large-scale captures (millions of points per frame with up to 60 frames per second (FPS)). Therefore, efficient point cloud compression (PCC) is useful to enable practical usage in VR and MR applications.

The Moving Picture Experts Group (MPEG) has approved two PCC (point cloud compression) standards: (1) S. Schwarz, M. Preda, V. Baroncini, M. Budagavi, P. Cesar, P. A. Chou, R. A. Cohen, M. Krivoku'ca, S. Lasserre, Z. Li et al., "Emerging MPEG standards for point cloud compression," IEEE Journal on Emerging and Selected Topics in Circuits and Systems, vol. 9, no. 1, pp. 133-148, 2018, and (2) D. Graziosi, O. Nakagami, S. Kuma, A. Zaghetto, T. Suzuki, and A. Tabatabai, "An overview of ongoing point cloud compression standardization activities: Video-based (v-pcc) and geometry-based (g-pcc)," APSIPA Transactions on Signal and Information Processing, vol. 9, 2020. MPEG has approved Geometry-based Point Cloud Compression (G-PCC) standard: "MPEG-PCC-TMC13: Geometry Based Point Cloud Compression G-PCC," 2021. [Online]. Available: https://github.com/MPEGGroup/mpeg-pcc-tmc13. MPEG has approved Video-based Point Cloud Compression (V-PCC): "MPEG-PCC-TMC2: Video Based Point Cloud Compression VPCC," 2022. [Online]. Available: https://github.com/MPEGGroup/mpeg-pcc-tmc2.

G-PCC includes octree-geometry coding as a generic geometry coding tool and a predictive geometry coding (tree-based) tool which is targeted toward LiDAR-based point clouds. G-PCC is still developing a triangle meshes or triangle soup (trisoup) based method to approximate the surface of the 3D model. V-PCC on the other hand encodes dynamic point clouds by projecting 3D points onto a 2D plane and then uses video codecs, e.g., High-Efficiency Video Coding (HEVC), to encode each frame overtime. MPEG has also proposed common test conditions (CTC) to evaluate test models: S. Schwarz, G. Martin-Cocher, D. Flynn, and M. Budagavi, "Common test conditions for point cloud compression," Document ISO/IECJTC1/SC29/WG11 w17766, Ljubljana, Slovenia, 2018.

Efficient point cloud compression is useful for applications like virtual and mixed reality, autonomous driving, and cultural heritage. Some techniques, like m59617: Anique Akhtar, Zhu Li, Geert Van der Auwera, Adarsh Krishnan Ramasubramonian, Luong Pham Van, Marta Karczewicz, Dynamic Point Cloud Geometry Compression using Sparse Convolutions, MPEG-137 Online, Doc. m59617, April 2022, and m60307: Anique Akhtar, Zhu Li, Geert Van der Auwera, Adarsh Krishnan Ramasubramonian, Marta Karczewicz, [AI-3DGC][EE5.3 Test 2] Results dynamic point cloud compression, MPEG-139 Online, Doc. M60307, July 2022, use deep learning-based point cloud compression for dense dynamic point clouds using deep learning network consisting of an encoder and decoder module. Deep learning-based point clouds compression schemes may be lacking in some ways. For instance, deep learning-based methods perform well in compressing the geometry of the point cloud, but may lack in effectively compressing the attribute associated with those point clouds. Many deep learning-based point cloud compression schemes may not work for attribute compression.

In one or more examples, this disclosure describes a flexible configuration of the deep learning-based framework where rather than having a joint geometry and attribute compression scheme, the example techniques use an attribute recomputing process, such as a recoloring scheme (as one example), to generate attributes for the reconstructed point cloud and employ other (e.g., traditional) attribute compression schemes. One or more of the example techniques described in this disclosure may utilize G-PCC's recoloring scheme, as an example, to get attributes of the target point cloud from the source point cloud. G-PCC's recoloring scheme employs weighted distance based nearest neighbors in the source point cloud to calculate attributes of the target point cloud. Accordingly, in one or more examples, the example techniques may allow use of an attribute compression from a different codec and the geometry compression from a different codec.

For instance, a G-PCC encoder may receive point cloud data of a source point cloud, also called original point cloud. The point cloud data includes geometry data and attribute data. The G-PCC encoder may generate bitstream(s) for the geometry data and the attribute data for a target point cloud based on the geometry data and the attribute data of the source point cloud. In general, the target point cloud and the source point cloud may be similar, but there may be some differences, as described in more detail. As one example, the locations of the points in the target point cloud may generally correspond to locations of points in the source point cloud, but may be shifted relative to the locations of points in the source point cloud. Also, attribute data of points in the target point cloud may be similar to the attribute data of points in the source point cloud, but there may be some differences.

Accordingly, the target point cloud may not be exactly the same as the source point cloud, but the difference between the target point cloud and the source point cloud may be sufficiently small that there is very little to no impact on performance. In one or more examples, the G-PCC encoder may encoding, in accordance with a first encoding process, the geometry data of the point cloud data of a source point cloud to generate encoded geometry data of a target point cloud and a geometry bitstream for the encoded geometry data of the target point cloud.

Because the geometry data of the target point cloud and the geometry data of the source point cloud may not be the exact same, there may be dissociation between the attribute data of the points in the source point cloud and the points in the target point cloud. For instance, in the source point cloud, each point may be associated with geometry data and attribute data. As the geometry data in the target point cloud may be different (e.g., slightly different) than the geometry data in the source point cloud, it may be unclear as to which point in the target point cloud is associated with the attribute data of which point in the source point cloud.

To address this dissociation, the G-PCC encoder may be configured to perform an attribute recomputing process. In the attribute recomputing process, the G-PCC encoder may be configured to determine attribute data for points in the target point cloud based on attribute data for points in the source point cloud. As an example, the G-PCC encoder may be configured to determine a plurality of points in the source point cloud that are proximate to a point in the target point cloud. The G-PCC encoder may utilize the attribute data of the proximate plurality of points in the source point cloud to determine the attribute data of the point the target point cloud.

With the attribute recomputing process on the attribute data of the point cloud data of the source point cloud, the G-PCC encoder may generate recomputed, reconstructed point cloud data of the target point cloud. The G-PCC encoder may encode, in accordance with the second encoding process, the recomputed, reconstructed point cloud data to generate an attribute bitstream.

In this way, the example techniques allow for a G-PCC encoder to encode geometry data using techniques that are well suited for encoding geometry data (e.g., a first encoding process), and encoding attribute data using techniques that are well suited for encoding attribute data (e.g., a second encoding process). With the use of the attribute recomputing process, the G-PCC encoder may address the disassociation issues when separately encoding the geometry data and the attribute data. Accordingly, the example techniques may provide for more efficient compression of the geometry data and attribute data (e.g., requiring fewer bits), resulting in a geometry bitstream and an attribute bitstream that are bandwidth efficient.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to attribute coding for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to attribute coding for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
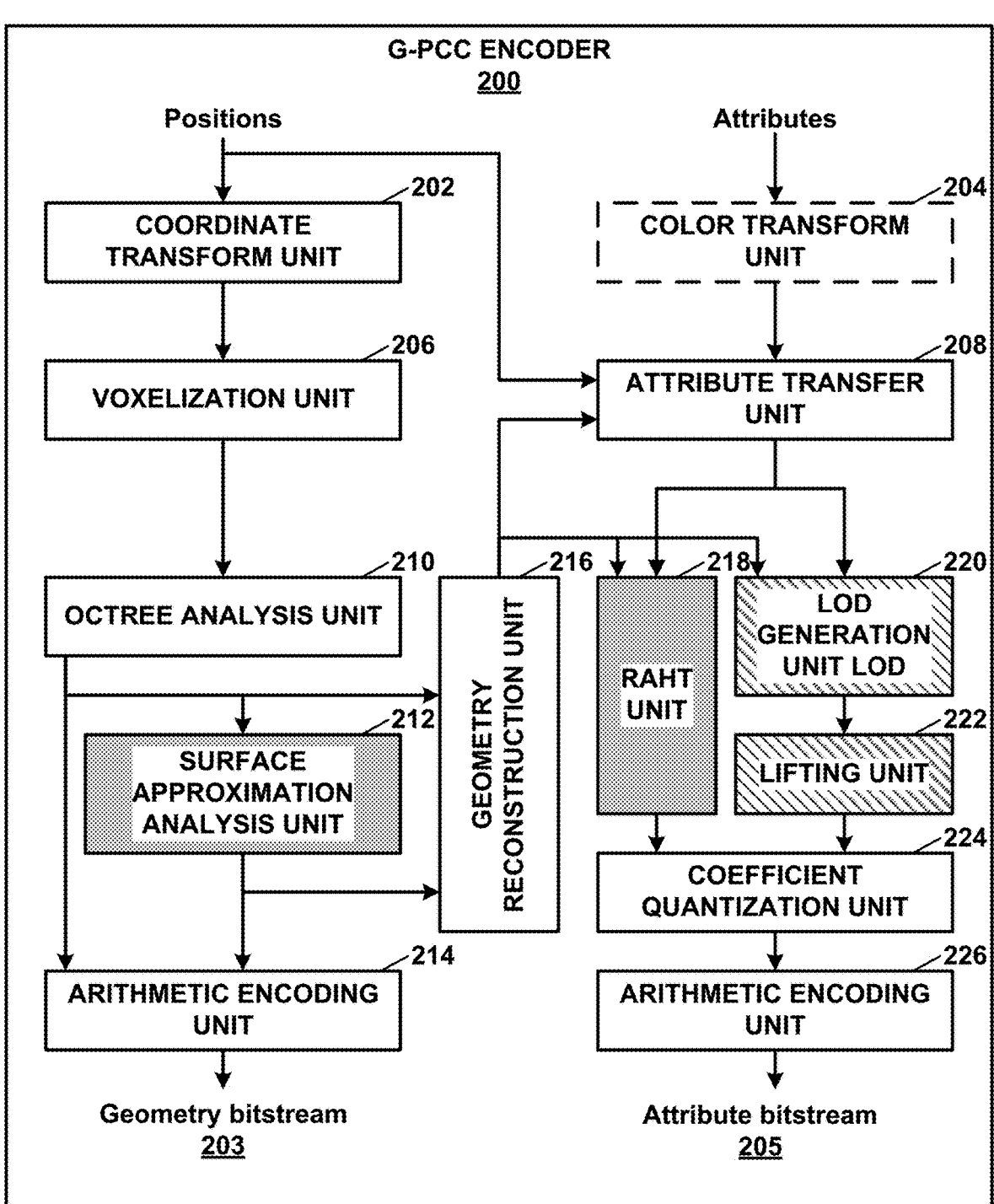
FIG. 2 is a block diagram illustrating an example Geometry Point Cloud Compression (G-PCC) encoder.
Figure 3:
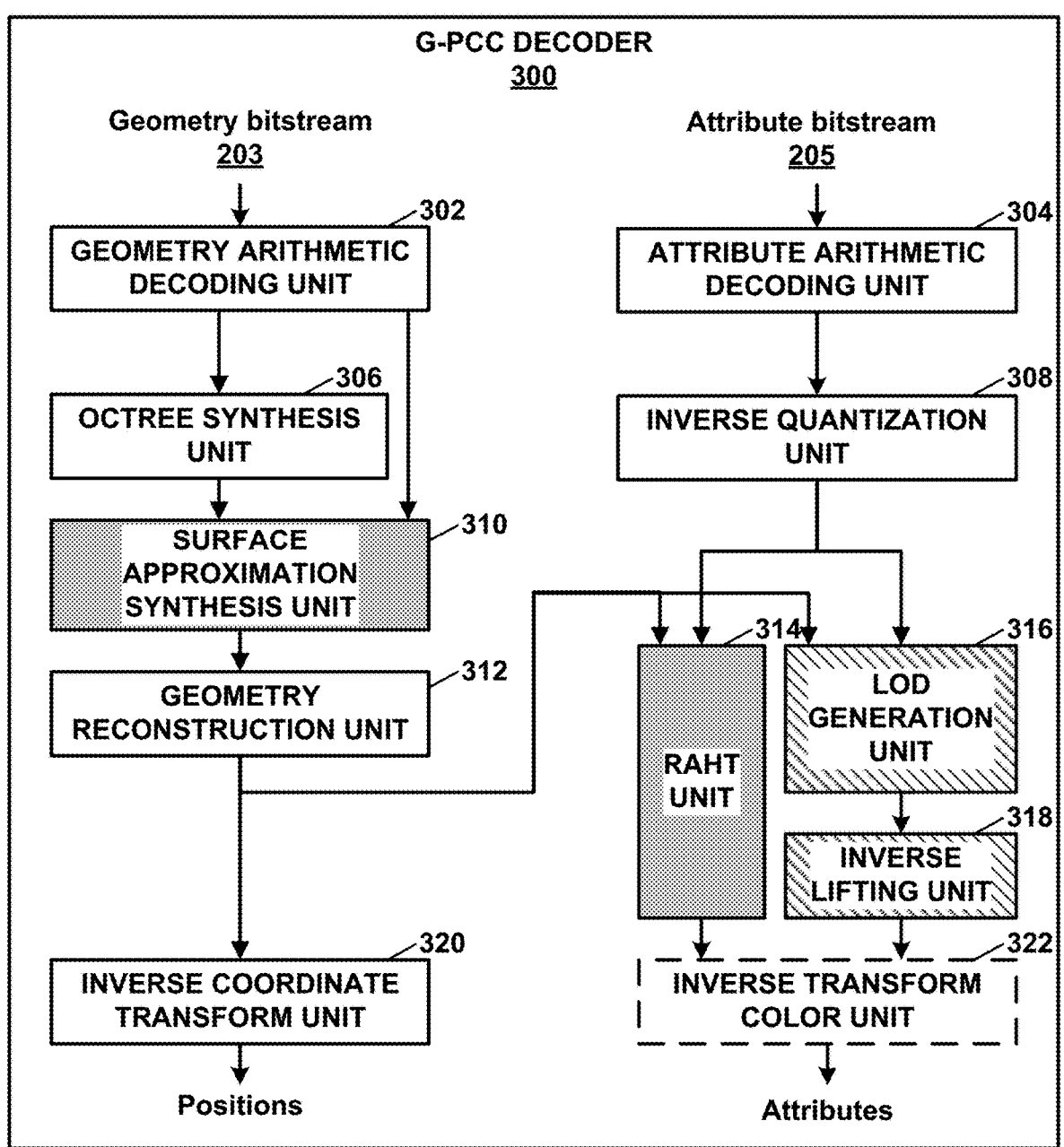
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CA-BAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

In one or more examples, machine learning, such as deep learning, techniques may be used for encoding and decoding of point cloud data. The following describes some examples of such machine learning techniques. A deep learning-based lossy point cloud geometry compression scheme for dynamic point cloud compression may be possible. A geometry scheme predicts the latent representation of the current frame using the previous frame by employing a prediction network. The example techniques perform P-frame inter-frame point cloud encoding where the current frame is encoded with the help of the previously decoded frame. The architecture is implemented using sparse convolution neural network (CNN) with sparse tensors. The example architecture employs convolution on target coordinates to map the latent representation of the previous frame to the downsampled coordinates of the current frame to predict the current frame's feature embedding. The encoder transmits the residual of the predicted features and the actual features by compressing them using a learned probabilistic factorized entropy model. Compared with G-PCC and V-PCC, the machine learning techniques show better compression performance on dense point clouds with efficient encoding/decoding runtime.

However, there may be issues with using machine learning for encoding/decoding (e.g., compressing/decompressing) point cloud data. Often a point cloud compression codec could perform well at geometry coding and be lacking in attribute coding or vice versa. This may be true for deep learning-based point cloud compression schemes, where deep learning-based point cloud compression schemes often perform well at geometry compression but cannot or are lacking in attribute compression.

However, in the lossy compression schemes, the geometry of the reconstructed point cloud, also called target point cloud, is different from the original point cloud, also called source point cloud. This means that the attribute compression is often coupled with the geometry compression to have correspondence (e.g., association) between the geometry and their corresponding attributes. That is, to maintain the correspondence (e.g., association) between the geometry and their corresponding attributes, the compression of point cloud data is performed jointly for the geometry data and the attribute data of the point cloud data. However, in lossy compression schemes, the geometry encoder changes the position of the geometry points and hence the correspondence between the reconstructed geometry and the reconstructed attributes are lost. Therefore, geometry data and attribute data are often compressed together in the same codec.

In one or more examples described in this disclosure, to achieve the coding efficiencies, such as that of deep learning, as a non-limiting example, there may be benefit in being able to separate the geometry compression and the attribute compression from the compression frameworks, and then be able to combine geometry compression methods from one codec with the attribute compression method of another codec to be able to obtain better compression performance. In one or more examples, this disclosure describes flexible configurations in the compression framework, where G-PCC encoder 200 and G-PCC decoder 300 employ deep learning-based geometry compression with attribute compression methods for point cloud compression.

This disclosure describes a framework to use a geometry encoder/decoder from one codec and attribute encoder/decoder from a separate codec to create a complete codec that would outperform each individual codecs. There may be challenges to perform in lossy point cloud compression because the geometry changes after compression and attaching the attribute to their corresponding geometry is challenging. In some examples, G-PCC encoder 200 and G-PCC decoder 300 may utilize a first encoding/decoding process (e.g., deep learning-based point cloud geometry compression) for geometry data along with a second encoding/decoding process (e.g., G-PCC attribute compression) for attribute data, as illustrated in FIGS. 4 and 5, respectively.

Figure 4:
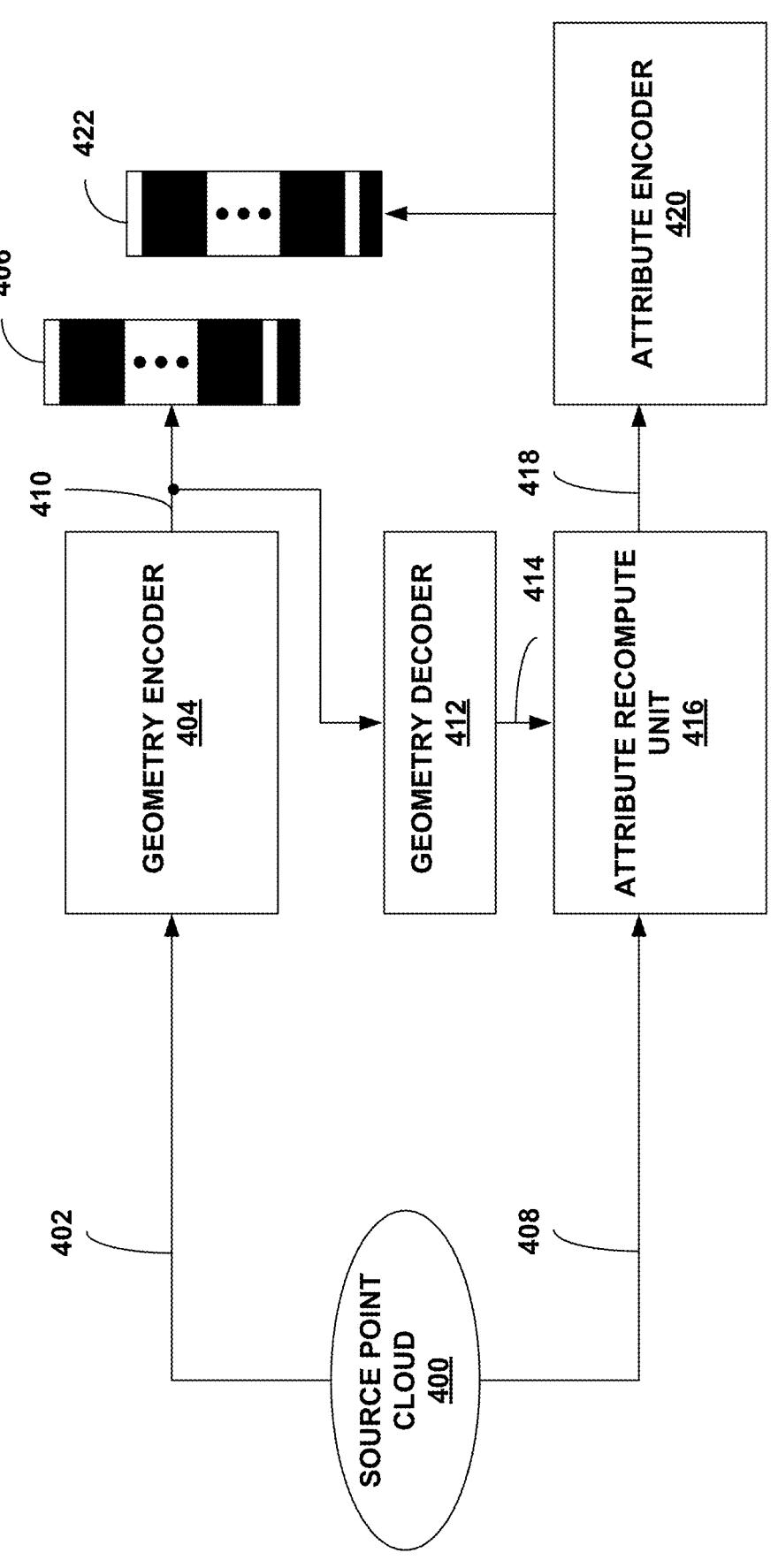
FIG. 4 is a conceptual diagram illustrating an example encoding framework.
Figure 5:
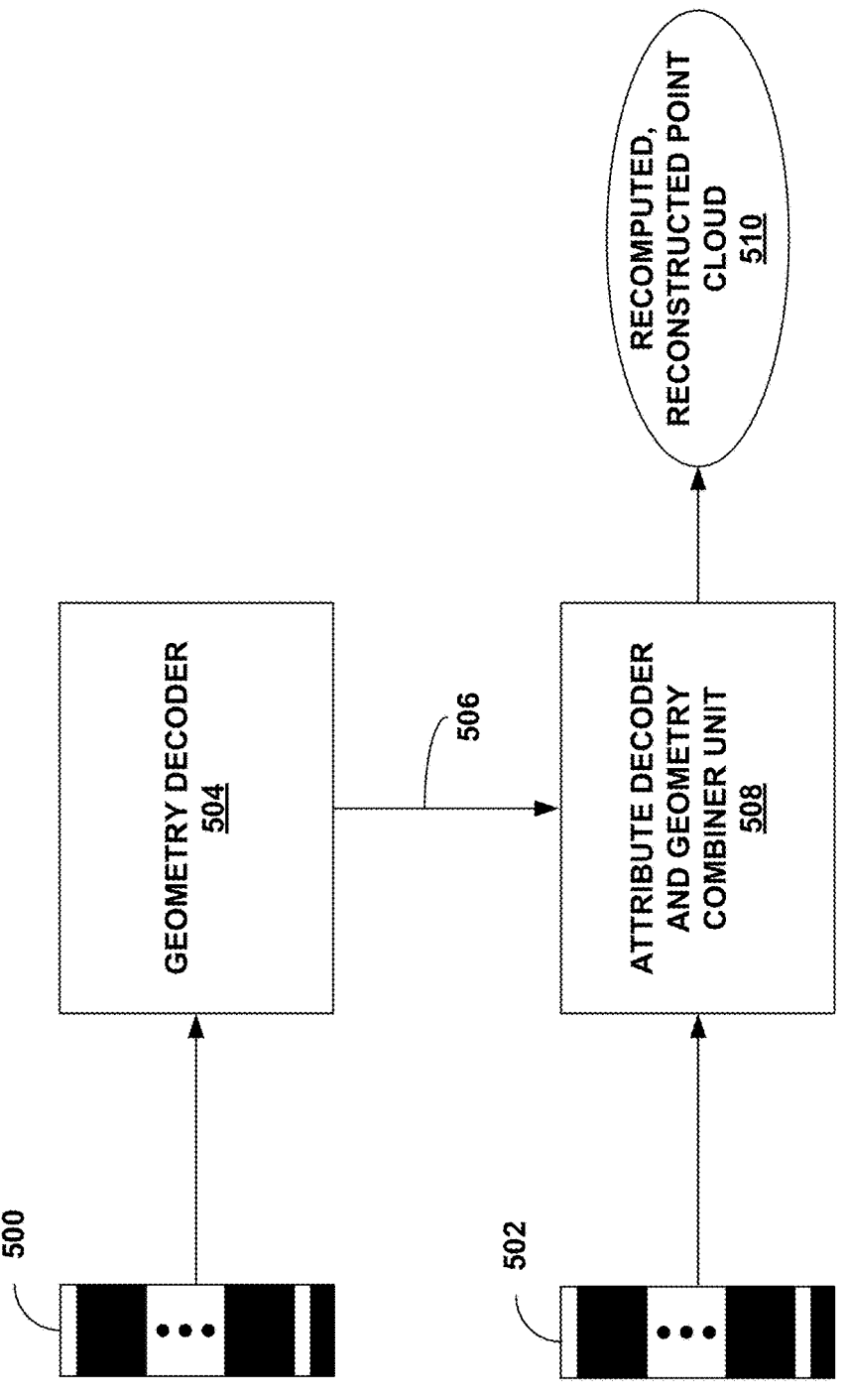
FIG. 5 is a conceptual diagram illustrating an example decoding framework.

FIG. 4 is a conceptual diagram illustrating an example encoding framework. FIG. 5 is a conceptual diagram illustrating an example decoding framework. In some examples, G-PCC encoder 200 compresses and G-PCC decoder 300 decompresses the geometry using deep learning-based encoder-decoder, and may use other techniques (e.g., RAHT portion of G-PCC) for attributes, to obtain a reconstructed point cloud, also called target point cloud. The reconstructed point cloud (i.e., target point cloud) differs in geometry from the original point cloud, also called source point cloud, and may not simply use the original point cloud's attributes.

The target point cloud, or reconstructed point cloud, may be a data structure in which geometry data and attribute data are associated with one another. For instance, in this disclosure, points in the target point cloud may refer to the data structure in which geometry data and attribute data are associated with another. As an example, the point may be an index into the data structure. The example techniques may not require full generation of the target point cloud, such as for display at G-PCC encoder 200. However, it may be possible to generate the target point cloud for display or other purposes at G-PCC encoder 200. The target point cloud may be regenerated at G-PCC decoder 300 for performing operations, including possibly for display.

In some examples, G-PCC encoder 200 and G-PCC decoder 300 may perform an attribute recomputing process, such as G-PCC's recoloring scheme (as one example), to change the original point cloud's attributes (e.g., attribute data of the source point cloud) to create newer attributes for the reconstructed point cloud (e.g., attribute data for points of the target point cloud). The recolored point cloud (e.g., target point cloud with the attribute from the attribute recomputing process) has geometry of the reconstructed point cloud (e.g., target point cloud) and attributes that were derived from the original point cloud (e.g., source point cloud). In some examples, the recolored point cloud may be encoded by G-PCC 200 where the geometry was encoded in a lossless manner and the attributes were encoded in a lossy manner. The reconstructed geometry is combined with reconstructed attributes to obtain the reconstructed point cloud.

For instance, as illustrated in FIG. 4, processing circuitry that includes G-PCC encoder 200 includes geometry encoder 404, geometry decoder 412, attribute recompute unit 416, and attribute encoder 420. One or more memories (e.g., memory 106 or other local memory) coupled to the processing circuitry that includes G-PCC encoder 200 may store source point cloud 400, also called original point cloud.

In one or more examples, geometry encoder 404 may be part of arithmetic encoding unit 214, and attribute encoder 420 may be part of arithmetic encoding unit 226. However, the techniques are not so limited.

Geometry encoder 404 and attribute encoder 420 are illustrated as separate units as an example, but may be combined. For instance, in one or more examples, the processing circuitry that includes G-PCC encoder 200 may be considered as an encoder configured to perform a first encoding process and a second encoding process.

Geometry encoder 404 and attribute encoder 420 may be separate units as well. For instance, in one or more examples, the processing circuitry that includes G-PCC encoder 200 may include a first encoder (e.g., geometry encoder 404) configured to perform the first encoding process, and a second encoder (e.g., attribute encoder 420) configured to perform the second encoding process. The first encoder (e.g., geometry encoder 404) may be a machine-learning based encoder, and the second encoder (e.g., attribute encoder 420) may be a non-machine-learning based encoder. The first encoder (e.g., geometry encoder 404) may be a machine-learning based encoder, and the second encoder (e.g., attribute encoder 420) may be a machine-learning based encoder.

Geometry encoder 404 receives, for a first encoding process, geometry data 402 of the point cloud data of source point cloud 400, and encodes, in accordance with a first encoding, the geometry data 402 to generate encoded geometry data 410 of a target point cloud. In addition, geometry encoder 404 generates geometry bitstream 406. Geometry bitstream 406 may include syntax elements and encoded values that G-PCC decoder 300 can parse to generate geometry data for the target point cloud. In some examples, geometry bitstream 406 may include encoded geometry data 410 of the target point cloud.

In one or more examples, geometry encoder 404 may be a deep learning-based geometry encoder (e.g., neural network based geometry encoder). For instance, geometry encoder 404 may be a learned geometry encoder model that the processing circuitry that includes G-PCC encoder 200 executes. As one example, the learned geometry encoder model may be generated based on a machine learning algorithm, examples of which include artificial neural networks (ANNs), deep neural networks (DNNs), graph neural networks (GNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

The trained geometry encoder model may be configured to generate a geometry data predictor, such as based on previous geometry data. In one or more examples, the geometry encoder model may be trained in servers and devices other than source device 102. For instance, during training, the geometry encoder model may be fed geometry data of a point cloud and training geometry data predictors based on the fed geometry data that are predictors for future point clouds. During training, the servers may adjust weights and biases of the neural network of the geometry encoder model to train the geometry encoder model based on a loss function indicative of difference between the geometry data predictor that the geometry encoder model outputs and the training geometry data predictors. The servers may then output the trained geometry encoder model to G-PCC encoder 200.

Geometry encoder 404 being a deep learning-based geometry encoder (e.g., neural network based geometry encoder) is described for purposes of example. Geometry encoder 404 may be configured to encode geometry data using other techniques, including non-machine learning techniques.

Geometry decoder 412 may decode the encoded geometry data to generate reconstructed geometry data 414 for the target point cloud. In general, geometry decoder 412 may be configured to perform the inverse process of geometry encoder 404.

In one or more examples, reconstructed geometry data 414 for the target point cloud may be different than geometry data 402 of source point cloud 400. For example, assume that geometry data 402 of source point cloud 400 includes Cartesian coordinates for 100 points, represented as (x1, y1, z1) to (x100, y100, z100). After the encoding process by geometry encoder 404 of geometry data 402 and the decoding process by geometry decoder 412 of encoded geometry data 410, the resulting reconstructed geometry data 414 may include Cartesian coordinates for 100 points, but the coordinates may not be (x1, y1, z1) to (x100, y100, z100). Instead, the coordinates may be (x1', y1', z1') to (x100', y100', and z100'), where x1 and x1' may not necessarily be equal, y1 and y1' may not necessarily be equal, z1 and z1' may not necessarily be equal, and so forth. It may be possible for one or all of (x1', y1', z1') to be equal to respective one of (x1, y1, z1), but it may not be necessarily true in all cases that (x1', y1', z1') are equal to respective one of (x1, y1, z1). Accordingly, geometry data for source point cloud 400 and the geometry data (e.g., reconstructed geometry data 414) for the target point cloud may be different.

Attribute recompute unit 416 may receive reconstructed geometry data 414 for the target point cloud and attribute data 408 for source point cloud 400. In some examples, attribute data 408 for source point cloud 400 may be geometry and attribute data for source point cloud 400.

Attribute data 408 may have association (e.g., correspondence) with geometry data 402. For instance, a point in source point cloud 400 may have geometry data (e.g., Cartesian coordinate) and attribute data (e.g., color and reflectance). In this example, the attribute data for the point in the source point cloud 400 and the geometry data for the point in the source point cloud 400 may be associated.

As described above, reconstructed geometry data 414 of the target point cloud may be different than geometry data 402 of source point cloud 400. Therefore, attribute data 408 may be disassociated with reconstructed geometry data 414. Attribute recompute unit 416 may be configured to address the disassociation.

Attribute recompute unit 416 may be configured to perform an attribute recomputing process on attribute data 408 of the point cloud data of the source point cloud 400 based on the reconstructed geometry data 414 to generate recomputed, reconstructed point cloud data 418 of the target point cloud. As one example, attribute recompute unit 416 may access attribute data of points in source point cloud 400 to determine attribute data for points in the target point cloud.

For example, attribute recompute unit 416 may receive the reconstructed geometry data 414 for a first point of the target point cloud. Attribute recompute unit 416 may determine a plurality of points in the point cloud data of the source point cloud 400 that are proximate to the first point of the target point cloud based on the reconstructed geometry data 414. For example, the reconstructed geometry data 414 for the first point of the target point cloud may include coordinates such as (x1', y1', z1'). Attribute recompute unit 416 may determine a plurality of points in source point cloud 400 that are proximate to the first point based on the coordinates of the plurality of points. For instance, attribute recompute unit 416 may determine distances between the first point of the target point cloud and points in the source point cloud 400 based on the coordinates of the first point in the target point cloud and the points in the source point cloud 400. Based on the distances, attribute recompute unit 416 may determine the proximate points, in source point cloud 400, that are proximate to the first point in the target point cloud.

Attribute recompute unit 416 may determine attribute data for the plurality of points in the point cloud data of the source point cloud 400. As one example, attribute recompute unit 416 may determine color and reflectance values. Attribute recompute unit 416 may determine attribute data for the first point in the target point cloud based on the attribute data for the plurality of points of the source point cloud 400. For instance, attribute recompute unit 416 may determine a weighted average (e.g., closer points to the first are weighted more than further points to the first point) of the attribute data of the points in source point cloud 400. The result may be the recomputed, reconstructed point cloud data 418 for the first point in the target point cloud.

Attribute recompute unit 416 may repeat these operations for other points in the target point cloud. In some examples, if the coordinates for the first point in the target point cloud are the same as the coordinates of a point in the source point cloud 400, then attribute recompute unit 416 may determine the attribute data for the first point in the target point cloud based on (e.g., only on) the attribute data for the point in source point cloud 400 having the same coordinates. For instance, attribute recompute unit 416 may assign the attribute data of the point in the source point cloud 400 having the same coordinate as the first point in the target point cloud equal to the attribute data of the first point in the target point cloud.

The above example techniques may be considered as an example of recoloring. For instance, attribute recompute unit 416 may be configured to perform a re-coloring process on the attribute data 408. The recomputed, reconstructed point cloud data 418 may include re-colored, reconstructed point cloud data. In some example, the re-coloring process includes a weighted distance based nearest neighbor search-based re-coloring process, similar to the example described above.

The above are some example techniques for performing attribute recomputing process by attribute recompute unit 416. However, the example techniques are not so limited. In some examples, to perform the attribute recompute process, attribute recompute unit 416 may be configured to apply a deep learning mechanism. For instance, attribute recompute unit 416 may represent a trained attribute recompute model that receives attribute data 408 and reconstructed geometry data 414 as input, and using machine-learning techniques (e.g., deep learning mechanism) generates recomputed, reconstructed point cloud data 418.

Attribute encoder 420 may receive recomputed, reconstructed point cloud data 418 of the target point cloud. That is, recomputed, reconstructed point cloud data 418 may be similar to but not necessarily identical to the point cloud data of source point cloud 400.

Attribute encoder 420 may be configured to encode, in accordance with a second encoding process, the recomputed, reconstructed point cloud data 418 to generate an attribute bitstream 422. For instance, geometry encoder 404 may be configured to encode in accordance with a first encoding process, and attribute encoder 420 may be configured to encode in accordance with a second encoding process.

There may be various examples ways in which attribute encoder 420 may encode the recomputed, reconstructed point cloud data 418. As one example, attribute encoder 420 may perform joint encoding of geometry data of source point cloud 400 and recomputed, reconstructed point cloud data 418, using traditional G-PCC encoders. However, in such examples, the traditional G-PCC encoders may generate both a geometry bitstream and an attribute bitstream. In this example, because geometry encoder 404 generated the geometry bitstream, the geometry bitstream from attribute encoder 420 may be dropped. The attribute bitstream that attribute encoder 420 generated may become attribute bitstream 422. Such traditional G-PCC encoders may be lossy for the attribute encoding process. Accordingly, in some examples, attribute encoder 420 may perform a lossy attribute encoding process.

As other examples, the second encoding process performed by attribute encoder 420 may be deep learning encoding process (e.g., trained and implemented separately than the deep learning encoding process that geometry encoder 404 may utilize). As another example, the second encoding process performed by attribute encoder 420 may be a video point cloud compression (V-PCC) encoding process.

In one or more examples, the processing circuitry that includes G-PCC encoder 200 may be configured to perform a hybrid encoding process in which geometry data and attribute data are encoded using different encoding techniques. For instance, the first encoding process (e.g., used by geometry encoder 404), and the second encoding process (e.g., used by attribute encoder 420) may be different encoding processes.

FIG. 5 illustrates processing circuitry of G-PCC decoder 300, and includes geometry decoder 504 and attribute decoder and geometry combiner unit 508. As illustrated, geometry decoder 504 may receive geometry bitstream 500. Geometry bitstream 500 may be similar to geometry bitstream 406. Geometry decoder 504 may be similar to geometry decoder 412, and may be configured to perform the inverse process of geometry encoder 404. For example, geometry decoder 504 may be a deep learning-based geometry decoder in examples where geometry encoder 404 is a deep learning-based geometry encoder.

In one or more examples, geometry decoder 504 may be part of geometric arithmetic decoding unit 302, and attribute decoder and geometry combiner unit 508 may be part of attribute arithmetic decoding unit 304. However, the techniques are not so limited.

Geometry decoder 504 and attribute decoder and geometry combiner unit 508 are illustrated as separate units as an example, but may be combined. For instance, in one or more examples, the processing circuitry that includes G-PCC decoder 300 may be considered as a decoder configured to perform a first decoding process and a second decoding process.

Geometry decoder 504 and attribute decoder and geometry combiner unit 508 may be separate units as well. For instance, in one or more examples, the processing circuitry that includes G-PCC decoder 300 may include a first decoder (e.g., geometry decoder 504) configured to perform the first decoding process, and a second encoder (e.g., attribute decoder and geometry combiner unit 508) configured to perform the second decoding process. The first decoder (e.g., geometry decoder 504) may be a machine-learning based encoder, and the second decoder (e.g., attribute decoder and geometry combiner unit 508) may be a non-machine-learning based decoder. The first decoder (e.g., geometry decoder 504) may be a machine-learning based encoder, and the second decoder (e.g., attribute decoder and geometry combiner unit 508) may be a machine-learning based decoder.

Accordingly, geometry decoder 504 may receive a geometry bitstream 500 including encoded geometry data of the point cloud data that is encoded in accordance with a first encoding process (e.g., same encoding process as geometry encoder 404). Geometry decoder 504 may decode, with a first decoding process that is reciprocal of the first encoding process, the encoded geometry data to generate reconstructed geometry data 506. In some examples, reconstructed geometry data 506 may not include attribute data.

Attribute decoder and geometry combiner unit 508 may receive an attribute bitstream 502 including encoded attribute data of the point cloud data that is encoded in accordance with a second encoding process (e.g., same encoding process as attribute encoder 420). Attribute decoder and geometry combiner unit 508 may decode, with a second decoding process that is reciprocal of the second encoding process and based on the reconstructed geometry data 506, the encoded attribute data to generate decoded attribute data and reconstructed geometry data of the point cloud data. For instance, Attribute decoder and geometry combiner unit 508 may generate recomputed, reconstructed point cloud 510. In some examples, the point cloud data for recomputed, reconstructed point cloud 510 may be similar to recomputed, reconstructed point cloud data 418; however, because attribute encoder 420 may be lossy, there may be some differences between the point cloud data of recomputed, reconstructed point cloud 510 and recomputed, reconstructed point cloud data 418.

Similar to the example of FIG. 4, the first decoding process (e.g., performed by geometry decoder 504) may be a deep learning-based geometry decoding process. The second decoding process (e.g., performed by attribute decoder and geometry combiner unit 508) may be a lossy attribute decoding process, a deep learning decoding process, or a V-PCC decoding process, as a few non-limiting examples. In some examples, the first decoding process and the second decoding process are different decoding processes.

The above example techniques are provided for ease of understanding, and should not be considered limiting. As one example, although geometry encoder 404 and geometry decoder 504 may be deep learning-based encoder and decoder, the geometry encoder 404 or the geometry decoder 504 is not necessarily limited to deep learning-based geometry encoder or decoder, but any geometry encoder or decoder could be employed.

For the recoloring, such as by attribute recompute unit 416 and/attribute decoder and geometry combiner unit 508, G-PCC encoder 200 and G-PCC decoder 300 may employ a weighted distance based nearest neighbor search-based recoloring scheme employed in the G-PCC standard: WG 7, MPEG 3D Graphics Coding, G-PCC codec description, Doc. N00271, January 2022. As described, the recoloring scheme may change the attributes to fit the newer geometry. However, any recoloring scheme that can alter the values of the attributes and/or their correspondence with the geometry could be employed as a recoloring scheme. That is, attribute recompute unit 416 and/attribute decoder and geometry combiner unit 508 may be perform various techniques to determine attribute data for the points.

The "recoloring" algorithm need not be limited to the "recoloring" of color attributes, for example, RGB or YCbCr, but can more generally be an algorithm that recomputes attribute values such as normal vectors, reflectance, etc., from point positions in one geometry to point positions in a second geometry. Deep learning mechanisms could also be applied to perform recoloring.

As described, in some examples, attribute encoder 420 may be a G-PCC lossless geometry and lossy attribute encoder. The example techniques are not limited to G-PCC lossless geometry and lossy attribute encoding, for example, G-PCC's Region Adaptive Hierarchical Transform (RAHT). As described, attribute encoder 420 may be employed with any encoding scheme including another deep learning-based encoding or using V-PCC. Furthermore, rather than employing a "lossless geometry and lossy attribute encoding," attribute encoder 420 may use any "lossy attribute encoder." Deep learning mechanisms could also be applied to perform decoding, such as by geometry decoder 504 and/or attribute decoder and geometry combiner unit 508.

The following describes examples of high-level syntax that may be signaled by G-PCC encoder 200 and received by G-PCC decoder 300. The attribute coding method type employed to code the recolored attributes may be signaled to the decoder side for the decoder to reconstruct the attribute values. This coding method, for example, G-PCC's Region Adaptive Hierarchical Transform (RAHT), can be signaled in a parameter set, for example, the sequence parameter or attribute parameter set as an identifier. The part of the bitstream that carries the coded attribute bits is, for example, a NALU. A list of coding methods may be specified, each coding method provides a means to code the attributes of the point cloud (optionally, they may also code the geometry in a lossless manner). An index to this list may be signaled in the bitstream to indicate the coding method used to code the attributes. This index may be signaled in a parameter set (e.g., APS, SPS) or other means. When deep learning mechanisms are used for recoloring or decoding, parameters/coefficients corresponding to recoloring or decoding may also be signaled in the bitstream.

For example, G-PCC encoder 200 and G-PCC decoder 300 may be configured to encode and decode point cloud data using a variety of different techniques, such as techniques described in this disclosure, as well as other traditional encoding or decoding techniques. Accordingly, G-PCC encoder 200 may signal information that G-PCC decoder 300 uses to determine a manner in which to decode. For instance, in some cases, geometry decoder 504 may utilize deep learning-based techniques, but for other cases, traditional decoding techniques may be utilized.

In one or more examples, the first and second decoding processes (e.g., decoding process employed by geometry decoder 504 and attribute decoder and geometry combiner unit 508, respectively) may be two of a plurality of decoding processes. In such examples, G-PCC decoder 300 may receive information indicating that the first and second decoding processes of the plurality of decoding processes is to be used for decoding.

FIG. 6 is a flowchart illustrating an example method of encoding point cloud data. For ease, reference is made to FIGS. 1 and 4. For instance, one or more memories, such as memory 106 or other memories, may be configured to store point cloud data of a source point cloud 400.

In the example of FIG. 6, processing circuitry that includes G-PCC encoder 200 may receive, for a first encoding process, geometry data of the point cloud data of a source point cloud (600). For example, geometry encoder 404 may receive, for a first encoding process, geometry data 402 of the point cloud data of a source point cloud 400.

The processing circuitry may be configured to encode, in accordance with the first encoding process, the geometry data to generate encoded geometry data and a geometry bitstream (602). For example, geometry encoder 404 may be configured to encode, in accordance with the first encoding process, the geometry data 402 to generate encoded geometry data 410 and a geometry bitstream 406. As one example, the first encoding process may be a deep learning-based geometry encoding process.

The processing circuitry may be configured to decode the encoded geometry data to generate reconstructed geometry data for a target point cloud (604). For example, geometry decoder 412 may perform the reciprocal of the first encoding process to decode the encoded geometry data 410 to generate reconstructed geometry data 414 for a target point cloud.

The processing circuitry may perform an attribute recomputing process on attribute data of the point cloud data of the source point cloud based on the reconstructed geometry data to generate recomputed, reconstructed point cloud data of the target point cloud (606). For example, attribute recompute unit 416 may perform an attribute recomputing process on attribute data 408 of the point cloud data of the source point cloud 400 based on the reconstructed geometry data 414 to generate recomputed, reconstructed point cloud data 418 of the target point cloud.

As one example, the processing circuitry may perform a re-coloring process on the attribute data 408. The recomputed, reconstructed point cloud data 418 may be re-colored, reconstructed point cloud data. In some examples, the re-coloring process includes a weighted distance based nearest neighbor search-based re-coloring process.

As another example that can be combine or performed separately, to perform the attribute recomputing process, attribute recompute unit 416 may be configured to receive the reconstructed geometry data 414 for a first point of the target point cloud, and determine a plurality of points in the point cloud data of the source point cloud 400 that are proximate to the first point of the target point cloud based on the reconstructed geometry data 414 (e.g., for the first point of the target point cloud). Attribute recompute unit 416 may determine attribute data for the plurality of points in the point cloud data of the source point cloud 400, and determine attribute data for the first point in the target point cloud based on the attribute data for the plurality of points of the source point cloud 400 to generate the recomputed, reconstructed point cloud data 418 of the target point cloud.

In some examples, to perform the attribute recomputing process, attribute recompute unit 416 may apply a deep learning mechanism to perform the attribute recomputing process. As an example, the above example techniques described for attribute recompute unit 416 or other attribute recomputing processes may be based on generating a learned model, and the processing circuitry executing that trained model to perform the attribute recomputing process.

The processing circuitry may encode, in accordance with a second encoding process, the recomputed, reconstructed point cloud data to generate an attribute bitstream (608). For example, attribute encoder 420 may encode, in accordance with the second encoding process, the recomputed, reconstructed point cloud data 418 to generate an attribute bitstream 422. Examples of the second encoding process include a lossy attribute encoding process, a deep learning encoding process, and a video point cloud compression (V-PCC) encoding process. In some examples, the first encoding process and the second encoding process are different encoding processes.

FIG. 7 is a flowchart illustrating an example method of decoding point cloud data. For ease, reference is made to FIGS. 1 and 5. For instance, one or more memories, such as memory 120 or other memories, may be configured to store point cloud data.

The processing circuitry that includes G-PCC decoder 300 may receive a geometry bitstream including encoded geometry data of the point cloud data that is encoded in accordance with a first encoding process (700). For example, geometry decoder 504 may receive geometry bitstream 500 including encoded geometry data of the point cloud data that is encoded in accordance with a first encoding process.

The processing circuitry may decode, with a first decoding process that is reciprocal of the first encoding process, the encoded geometry data to generate reconstructed geometry data (702). For example, geometry decoder 504 may decode, with a first decoding process that is reciprocal of the first encoding process, the encoded geometry data to generate reconstructed geometry data 506. The first decoding process may be a deep learning-based geometry decoding process.

The processing circuitry may receive an attribute bitstream including encoded attribute data of the point cloud data that is encoded in accordance with a second encoding process (704). For example, attribute decoder and geometry combiner unit 508 may receive attribute bitstream 502 including encoded attribute data of the point cloud data that is encoded in accordance with a second encoding process.

The processing circuitry may decode, with a second decoding process that is reciprocal of the second encoding process and based on the reconstructed geometry data, the encoded attribute data to generate decoded attribute data and reconstructed geometry data of the point cloud data (706). For example, attribute decoder and geometry combiner unit 508 decode, with a second decoding process that is reciprocal of the second encoding process and based on the reconstructed geometry data, the encoded attribute data to generate decoded attribute data and reconstructed geometry data of the point cloud data.

Examples of the second decoding process include a lossy attribute decoding process, a deep learning decoding process, and a video point cloud compression (V-PCC) decoding process. In some examples, the first decoding process and the second decoding process are different decoding processes. Also, in some examples, the first and second decoding processes are two of a plurality of decoding processes. The processing circuitry may receive information indicating that the first and second decoding processes of the plurality of decoding processes is to be used for decoding.

Figure 8:
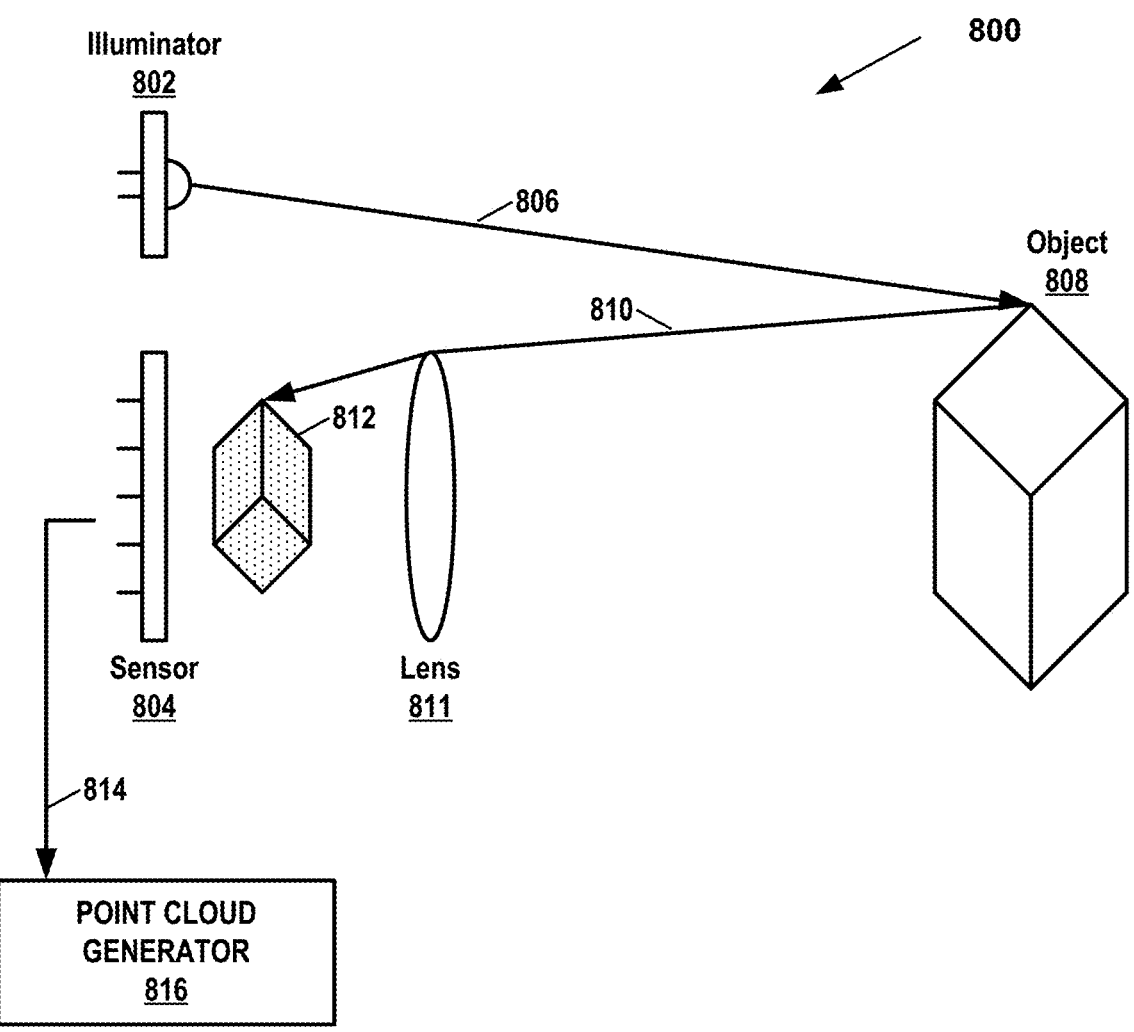
FIG. 8 is a conceptual diagram illustrating an example range-finding system that may be used with one or more techniques of this disclosure.

FIG. 8 is a conceptual diagram illustrating an example range-finding system 800 that may be used with one or more techniques of this disclosure. In the example of FIG. 8, range-finding system 800 includes an illuminator 802 and a sensor 804. Illuminator 802 may emit light 806. In some examples, illuminator 802 may emit light 806 as one or more laser beams. Light 806 may be in one or more wavelengths, such as an infrared wavelength or a visible light wavelength. In other examples, light 806 is not coherent, laser light.

When light 806 encounters an object, such as object 808, light 806 creates returning light 810. Returning light 810 may include backscattered and/or reflected light. Returning light 810 may pass through a lens 811 that directs returning light 810 to create an image 812 of object 808 on sensor 804. Sensor 804 generates signals 814 based on image 812. Image 812 may comprise a set of points (e.g., as represented by dots in image 812 of FIG. 8).

In some examples, illuminator 802 and sensor 804 may be mounted on a spinning structure so that illuminator 802 and sensor 804 capture a 360-degree view of an environment (e.g., a spinning LIDAR sensor). In other examples, range-finding system 800 may include one or more optical components (e.g., mirrors, collimators, diffraction gratings, etc.) that enable illuminator 802 and sensor 804 to detect ranges of objects within a specific range (e.g., up to 360-degrees). Although the example of FIG. 8 only shows a single illuminator 802 and sensor 804, range-finding system 800 may include multiple sets of illuminators and sensors.

In some examples, illuminator 802 generates a structured light pattern. In such examples, range-finding system 800 may include multiple sensors 804 upon which respective images of the structured light pattern are formed. Range-finding system 800 may use disparities between the images of the structured light pattern to determine a distance to an object 808 from which the structured light pattern backscatters. Structured light-based range-finding systems may have a high level of accuracy (e.g., accuracy in the sub-millimeter range), when object 808 is relatively close to sensor 804 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 800 is a time of flight (ToF)-based system. In some examples where range-finding system 800 is a ToF-based system, illuminator 802 generates pulses of light. In other words, illuminator 802 may modulate the amplitude of emitted light 806. In such examples, sensor 804 detects returning light 810 from the pulses of light 806 generated by illuminator 802. Range-finding system 800 may then determine a distance to object 808 from which light 806 backscatters based on a delay between when light 806 was emitted and detected and the known speed of light in air). In some examples, rather than (or in addition to) modulating the amplitude of the emitted light 806, illuminator 802 may modulate the phase of the emitted light 806. In such examples, sensor 804 may detect the phase of returning light 810 from object 808 and determine distances to points on object 808 using the speed of light and based on time differences between when illuminator 802 generated light 806 at a specific phase and when sensor 804 detected returning light 810 at the specific phase.

In other examples, a point cloud may be generated without using illuminator 802. For instance, in some examples, sensors 804 of range-finding system 800 may include two or more optical cameras. In such examples, range-finding system 800 may use the optical cameras to capture stereo images of the environment, including object 808. Range-finding system 800 may include a point cloud generator 816 that may calculate the disparities between locations in the stereo images. Range-finding system 800 may then use the disparities to determine distances to the locations shown in the stereo images. From these distances, point cloud generator 816 may generate a point cloud.

Sensors 804 may also detect other attributes of object 808, such as color and reflectance information. In the example of FIG. 8, a point cloud generator 816 may generate a point cloud based on signals 814 generated by sensor 804. Range-finding system 800 and/or point cloud generator 816 may form part of data source 104 (FIG. 1). Hence, a point cloud generated by range-finding system 800 may be encoded and/or decoded according to any of the techniques of this disclosure.

Figure 9:
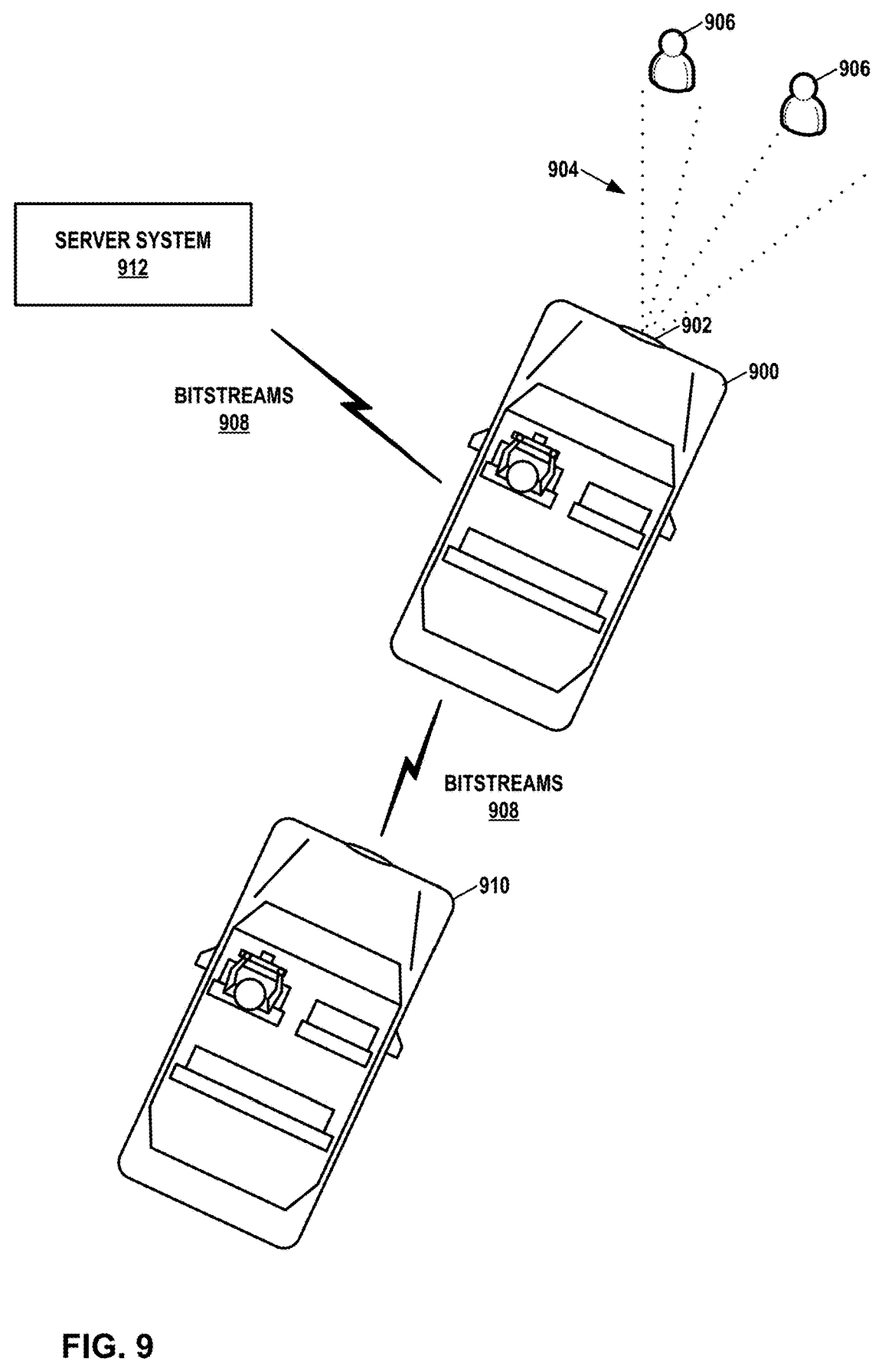

FIG. 9 is a conceptual diagram illustrating an example vehicle-based scenario in which one or more techniques of this disclosure may be used. In the example of FIG. 9, a vehicle 900 includes a range-finding system 902. Range-finding system 902 may be implemented in the manner discussed with respect to FIG. 8. Although not shown in the example of FIG. 9, vehicle 900 may also include a data source, such as data source 104 (FIG. 1), and a G-PCC encoder, such as G-PCC encoder 200 (FIG. 1). In the example of FIG. 9, range-finding system 902 emits laser beams 904 that reflect off pedestrians 906 or other objects in a roadway. The data source of vehicle 900 may generate a point cloud based on signals generated by range-finding system 902. The G-PCC encoder of vehicle 900 may encode the point cloud to generate bitstreams 908, such as geometry bitstream (FIG. 2) and attribute bitstream (FIG. 2).

An output interface of vehicle 900 (e.g., output interface 108 (FIG. 1) may transmit bitstreams 908 to one or more other devices. Bitstreams 908 may include many fewer bits than the unencoded point cloud obtained by the G-PCC encoder. Thus, vehicle 900 may be able to transmit bitstreams 908 to other devices more quickly than the unencoded point cloud data. Additionally, bitstreams 908 may require less data storage capacity on a device.

In the example of FIG. 9, vehicle 900 may transmit bitstreams 908 to another vehicle 910. Vehicle 910 may include a G-PCC decoder, such as G-PCC decoder 300 (FIG. 1). The G-PCC decoder of vehicle 910 may decode bitstreams 908 to reconstruct the point cloud. Vehicle 910 may use the reconstructed point cloud for various purposes. For instance, vehicle 910 may determine based on the reconstructed point cloud that pedestrians 906 are in the roadway ahead of vehicle 900 and therefore start slowing down, e.g., even before a driver of vehicle 910 realizes that pedestrians 906 are in the roadway. Thus, in some examples, vehicle 910 may perform an autonomous navigation operation based on the reconstructed point cloud.

Additionally or alternatively, vehicle 900 may transmit bitstreams 908 to a server system 912. Server system 912 may use bitstreams 908 for various purposes. For example, server system 912 may store bitstreams 908 for subsequent reconstruction of the point clouds. In this example, server system 912 may use the point clouds along with other data (e.g., vehicle telemetry data generated by vehicle 900) to train an autonomous driving system. In other example, server system 912 may store bitstreams 908 for subsequent reconstruction for forensic crash investigations.

Figure 10:
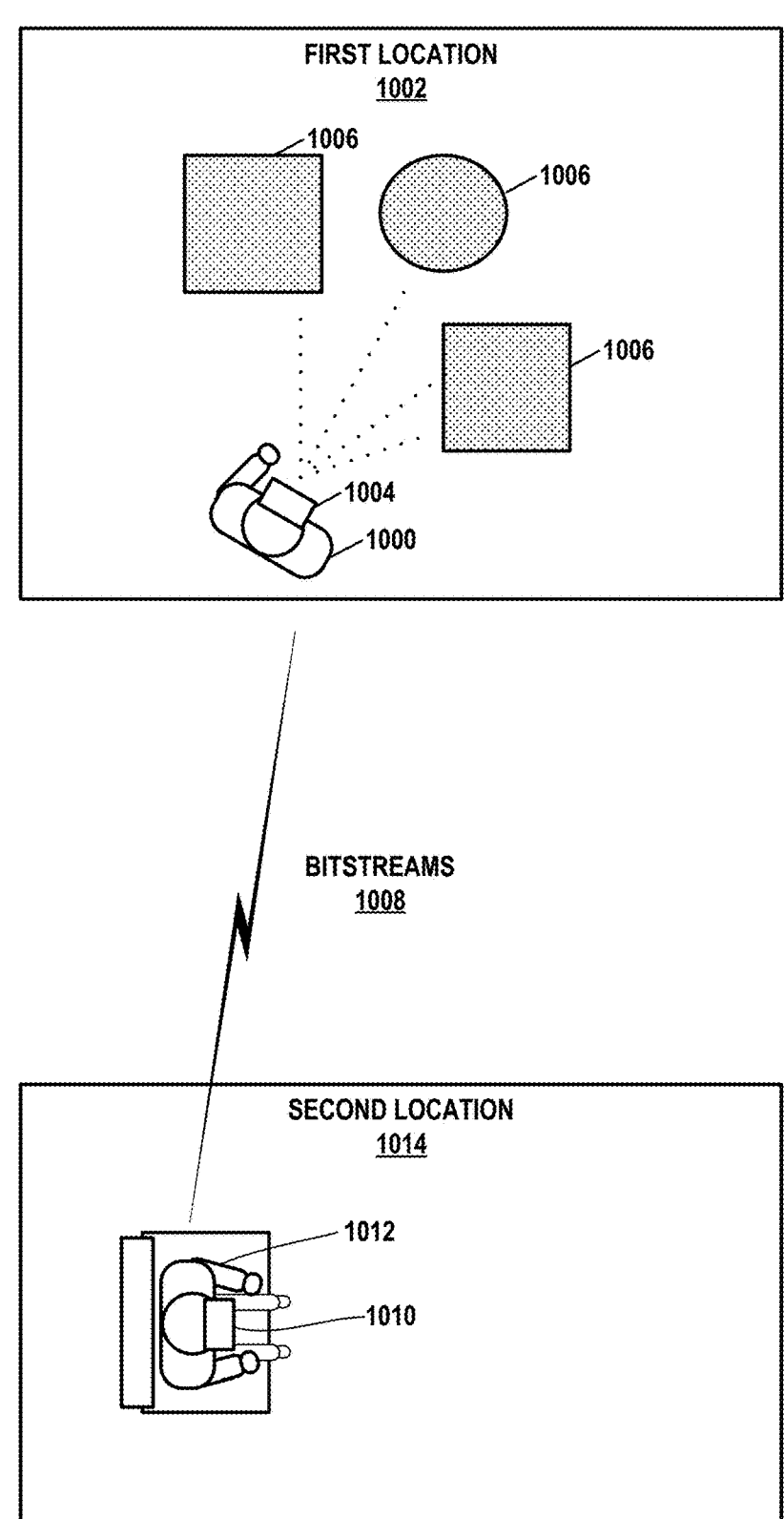
FIG. 10 is a conceptual diagram illustrating an example extended reality system in which one or more techniques of this disclosure may be used.

FIG. 10 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 10, a user 1000 is located in a first location 1002. User 1000 wears an XR headset 1004. As an alternative to XR headset 1004, user 1000 may use a mobile device (e.g., mobile phone, tablet computer, etc.). XR headset 1004 includes a depth detection sensor, such as a range-finding system, that detects positions of points on objects 1006 at location 1002. A data source of XR headset 1004 may use the signals generated by the depth detection sensor to generate a point cloud representation of objects

1006 at location 1002. XR headset 1004 may include a G-PCC encoder (e.g., G-PCC encoder 200 of FIG. 1) that is configured to encode the point cloud to generate bitstreams 1008.

XR headset 1004 may transmit bitstreams 1008 (e.g., via a network such as the Internet) to an XR headset 1010 worn by a user 1012 at a second location 1014. XR headset 1010 may decode bitstreams 1008 to reconstruct the point cloud. XR headset 1010 may use the point cloud to generate an XR visualization (e.g., an AR, MR, VR visualization) representing objects 1006 at location 1002. Thus, in some examples, such as when XR headset 1010 generates an VR visualization, user 1012 may have a 3D immersive experience of location 1002. In some examples, XR headset 1010 may determine a position of a virtual object based on the reconstructed point cloud. For instance, XR headset 1010 may determine, based on the reconstructed point cloud, that an environment (e.g., location 1002) includes a flat surface and then determine that a virtual object (e.g., a cartoon character) is to be positioned on the flat surface. XR headset 1010 may generate an XR visualization in which the virtual object is at the determined position. For instance, XR headset 1010 may show the cartoon character sitting on the flat surface.

Figure 11:
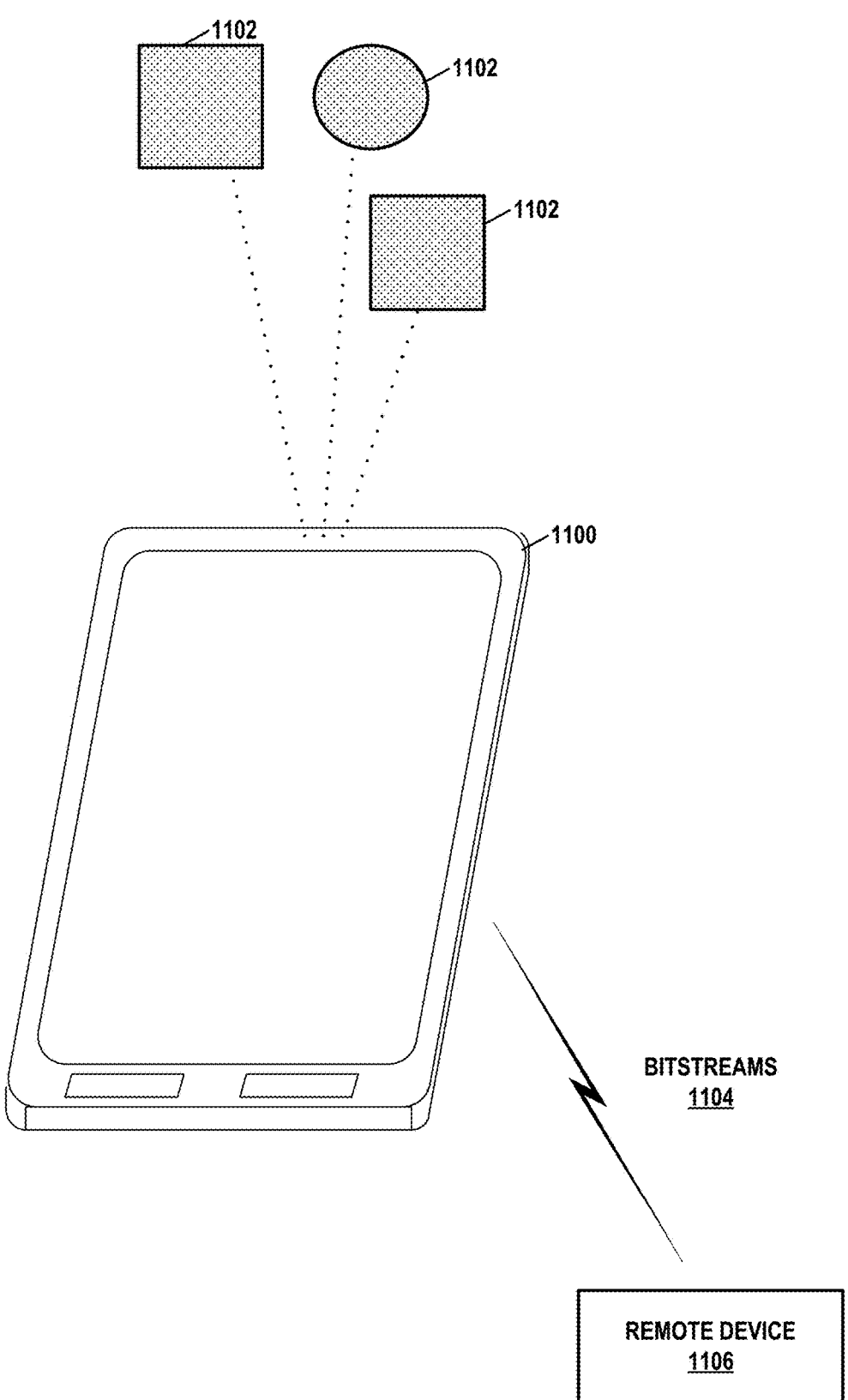
FIG. 11 is a conceptual diagram illustrating an example mobile device system in which one or more techniques of this disclosure may be used.

FIG. 11 is a conceptual diagram illustrating an example mobile device system in which one or more techniques of this disclosure may be used. In the example of FIG. 11, a mobile device 1100 (e.g., a wireless communication device), such as a mobile phone or tablet computer, includes a range-finding system, such as a LIDAR system, that detects positions of points on objects 1102 in an environment of mobile device 1100. A data source of mobile device 1100 may use the signals generated by the depth detection sensor to generate a point cloud representation of objects 1102. Mobile device 1100 may include a G-PCC encoder (e.g., G-PCC encoder 200 of FIG. 1) that is configured to encode the point cloud to generate bitstreams 1104. In the example of FIG. 11, mobile device 1100 may transmit bitstreams to a remote device 1106, such as a server system or other mobile device. Remote device 1106 may decode bitstreams 1104 to reconstruct the point cloud. Remote device 1106 may use the point cloud for various purposes. For example, remote device 1106 may use the point cloud to generate a map of environment of mobile device 1100. For instance, remote device 1106 may generate a map of an interior of a building based on the reconstructed point cloud. In another example, remote device 1106 may generate imagery (e.g., computer graphics) based on the point cloud. For instance, remote device 1106 may use points of the point cloud as vertices of polygons and use color attributes of the points as the basis for shading the polygons. In some examples, remote device 1106 may use the reconstructed point cloud for facial recognition or other security applications.

Examples in the various aspects of this disclosure may be used individually or in any combination.

Clause 1A. A method of encoding point cloud data, the method comprising: receiving, for a first encoding process, geometry data of the point cloud data and not attribute data of the point cloud data; encoding, in accordance with the first encoding process, the geometry data to generate a geometry bitstream; reconstructing the geometry data to generate reconstructed geometry data; performing an attribute recomputing process on the attribute data of the point cloud data based on the reconstructed geometry data to generate recomputed, reconstructed point cloud data; and encoding, in accordance with a second encoding process, the recomputed, reconstructed point cloud data to generate an attribute bitstream.

Clause 2A. The method of clause 1A, wherein the first encoding process comprises a deep learning-based geometry encoding process.

Clause 3A. The method of any of clauses 1A and 2A, wherein the second encoding process comprises a lossless geometry and lossy attribute encoding process.

Clause 4A. The method of any of clauses 1A and 2A, wherein the second encoding process comprises a deep learning encoding process.

Clause 5A. The method of any of clauses A, wherein the second encoding process comprises a video point cloud compression (V-PCC) encoding process.

Clause 6A. The method of clause 1A, wherein the first encoding process and the second encoding process are different encoding processes.

Clause 7A. The method of any of clauses 1A-6A, wherein performing the attribute recomputing process comprises performing a re-coloring process on the attribute data, wherein the recomputed, reconstructed point cloud data comprises re-colored, reconstructed point cloud data, and wherein encoding the recomputed, reconstructed point cloud data comprises encoding the re-colored, reconstructed point cloud data to generate the attribute bitstream.

Clause 8A. The method of clause 7A, wherein the re-coloring process comprises a weighted distance based nearest neighbor search-based re-coloring process.

Clause 9A. The method of any of clauses 1A-8A, wherein performing the attribute recomputing process comprises applying a deep learning mechanism to perform the attribute recomputing process.

Clause 10A. The method of any of clauses 1A-9A, wherein the attribute recomputing process is a first attribute recomputing process of a plurality of attribute recomputing processes, the method further comprising: signaling information indicating that the first attribute recomputing process of the plurality of attribute recomputing processes is used.

Clause 11A. The method of decoding point cloud data, the method comprising: receiving a geometry bitstream including encoded geometry data of the point cloud data that is encoded in accordance with a first encoding process; decoding, with a first decoding process that is reciprocal of the first encoding process, the encoded geometry data to generate reconstructed geometry data; receiving an attribute bitstream including encoded attribute data of the point cloud data that is encoded in accordance with a second encoding process; and decoding, with a second decoding process that is reciprocal of the second encoding process and based on the reconstructed geometry data, the encoded attribute data to generate decoded attribute data and reconstructed geometry data of the point cloud data.

Clause 12A. The method of clause 11A, wherein the first decoding process comprises a deep learning-based geometry decoding process.

Clause 13A. The method of any of clauses 11A and 12A, wherein the second decoding process comprises a lossless geometry and lossy attribute decoding process.

Clause 14A. The method of any of clauses 11A and 12A, wherein the second decoding process comprises a deep learning decoding process.

Clause 15A. The method of any of clauses 11A and 12A, wherein the second decoding process comprises a video point cloud compression (V-PCC) decoding process.

Clause 16A. The method of clause 11A, wherein the first decoding process and the second decoding process are different decoding processes.

Clause 17A. The method of any of clauses 11A-16A, wherein the second decoding process comprises an inverse re-coloring process.

Clause 18A. The method of clause 17A, wherein the inverse re-coloring process comprises a weighted distance based nearest neighbor search-based inverse re-coloring process.

Clause 19A. The method of any of clauses 11A-18A, wherein the second decoding process comprises a deep learning-based decoding process.

Clause 20A. The method of any of clauses 11A-19A, wherein the second decoding process is a one of a plurality of decoding processes, the method further comprising: receiving information indicating that the second decoding process of the plurality of decoding processes is to be used for decoding.

Clause 21A. A system for encoding point cloud data, the system comprising: memory configured to store point cloud data; and processing circuitry coupled to the memory and configured to perform the method of any of clauses 1A-10A.

Clause 22A. The system of clause 21A, wherein the processing circuitry is configured to generate the point cloud data.

Clause 23A. A system for decoding point cloud data, the system comprising: memory configured to store point cloud data; and processing circuitry coupled to the memory and configured to perform the method of any of clauses 11A-20A.

Clause 24A. The system of clause 23A, wherein the processing circuitry is configured to display to present imagery based on the point cloud.

Clause 25A. A device for coding point cloud data, the device comprising means for performing at least one of the method of any of clauses 1A-10A or the method of any of clauses 11A-20A.

Clause 26A. A computer-readable storage medium storing instructions thereon that when executed cause one or more processors to perform the method of any of clauses 1A-10A or the method of any of clauses 11A-20A.

Clause 1B. A method of encoding point cloud data, the method comprising: receiving, for a first encoding process, geometry data of the point cloud data of a source point cloud; encoding, in accordance with the first encoding process, the geometry data to generate encoded geometry data and a geometry bitstream; decoding the encoded geometry data to generate reconstructed geometry data for a target point cloud; performing an attribute recomputing process on attribute data of the point cloud data of the source point cloud based on the reconstructed geometry data to generate recomputed, reconstructed point cloud data of the target point cloud; and encoding, in accordance with a second encoding process, the recomputed, reconstructed point cloud data to generate an attribute bitstream.

Clause 2B. The method of clause 1B, wherein the first encoding process comprises a deep learning-based geometry encoding process.

Clause 3B. The method of any of clauses 1B and 2B, wherein the second encoding process comprises a lossy attribute encoding process.

Clause 4B. The method of any of clauses 1B and 2B, wherein the second encoding process comprises a deep learning encoding process.

Clause 5B. The method of any of clauses 1B and 2B, wherein the second encoding process comprises a video point cloud compression (V-PCC) encoding process.

Clause 6B. The method of any of clauses 1B-5B, wherein the first encoding process and the second encoding process are different encoding processes.

Clause 7B. The method of any of clause 1B-6B, wherein performing the attribute recomputing process comprises performing a re-coloring process on the attribute data, wherein the recomputed, reconstructed point cloud data comprises re-colored, reconstructed point cloud data, and wherein encoding the recomputed, reconstructed point cloud data comprises encoding the re-colored, reconstructed point cloud data to generate the attribute bitstream.

Clause 8B. The method of clause 7B, wherein the re-coloring process comprises a weighted distance based nearest neighbor search-based re-coloring process.

Clause 9B. The method of any of clauses 1B-8B, wherein performing the attribute recomputing process comprises: receiving the reconstructed geometry data for a first point of the target point cloud; determining a plurality of points in the point cloud data of the source point cloud that are proximate to the first point of the target point cloud based on the reconstructed geometry data; determining attribute data for the plurality of points in the point cloud data of the source point cloud; and determining attribute data for the first point in the target point cloud based on the attribute data for the plurality of points of the source point cloud to generate the recomputed, reconstructed point cloud data of the target point cloud.

Clause 10B. The method of any of clauses 1B-8B, wherein performing the attribute recomputing process comprises applying a deep learning mechanism to perform the attribute recomputing process.

Clause 11A. A method of decoding point cloud data, the method comprising: receiving a geometry bitstream including encoded geometry data of the point cloud data that is encoded in accordance with a first encoding process; decoding, with a first decoding process that is reciprocal of the first encoding process, the encoded geometry data to generate reconstructed geometry data; receiving an attribute bitstream including encoded attribute data of the point cloud data that is encoded in accordance with a second encoding process; and decoding, with a second decoding process that is reciprocal of the second encoding process and based on the reconstructed geometry data, the encoded attribute data to generate decoded attribute data and reconstructed geometry data of the point cloud data.

Clause 12B. The method of clause 11B, wherein the first decoding process comprises a deep learning-based geometry decoding process.

Clause 13B. The method of any of clauses 11B and 12B, wherein the second decoding process comprises a lossy attribute decoding process.

Clause 14B. The method of any of clauses 11B and 12B, wherein the second decoding process comprises a deep learning decoding process.

Clause 15B. The method of any of clauses 11B and 12B, wherein the second decoding process comprises a video point cloud compression (V-PCC) decoding process.

Clause 16B. The method of any of clauses 11B-15B, wherein the first decoding process and the second decoding process are different decoding processes.

Clause 17B. The method of any of clauses 11B-16B, wherein the first and second decoding processes are two of a plurality of decoding processes, the method further comprising: receiving information indicating that the first and second decoding processes of the plurality of decoding processes is to be used for decoding.

Clause 18B. A system for encoding point cloud data, the system comprising: one or more memories configured to store point cloud data; and processing circuitry coupled to the one or more memories and configured to: receive, for a first encoding process, geometry data of the point cloud data of a source point cloud; encode, in accordance with the first encoding process, the geometry data to generate encoded geometry data and a geometry bitstream; decode the encoded geometry data to generate reconstructed geometry data for a target point cloud; perform an attribute recomputing process on attribute data of the point cloud data of the source point cloud based on the reconstructed geometry data to generate recomputed, reconstructed point cloud data of the target point cloud; and encode, in accordance with a second encoding process, the recomputed, reconstructed point cloud data to generate an attribute bitstream.

Clause 19B. The system of clause 18B, wherein the first encoding process comprises a deep learning-based geometry encoding process.

Clause 20B. The system of any of clauses 18B and 19B, wherein the second encoding process comprises a lossy attribute encoding process.

Clause 21B. The system of any of clauses 18B and 19B, wherein the second encoding process comprises a deep learning encoding process.

Clause 22B. The system of any of clauses 18B and 19B, wherein the second encoding process comprises a video point cloud compression (V-PCC) encoding process.

Clause 23B. The system of any of clauses 18B-22B, wherein the first encoding process and the second encoding process are different encoding processes.

Clause 24B. The system of any of clauses 18B-23B, wherein to perform the attribute recomputing process, the processing circuitry is configured to perform a re-coloring process on the attribute data, wherein the recomputed, reconstructed point cloud data comprises re-colored, reconstructed point cloud data, and wherein to encode the recomputed, reconstructed point cloud data, the processing circuitry is configured to encode the re-colored, reconstructed point cloud data to generate the attribute bitstream.

Clause 25B. The system of clause 24B, wherein the re-coloring process comprises a weighted distance based nearest neighbor search-based re-coloring process.

Clause 26B. The system of any of clauses 18B-25B, wherein to perform the attribute recomputing process, the processing circuitry is configured to: receive the reconstructed geometry data for a first point of the target point cloud; determine a plurality of points in the point cloud data of the source point cloud that are proximate to the first point of the target point cloud based on the reconstructed geometry data; determine attribute data for the plurality of points in the point cloud data of the source point cloud; determine attribute data for the first point in the target point cloud based on the attribute data for the plurality of points of the source point cloud; and assign the attribute data for the first point of the target point cloud to generate the recomputed, reconstructed point cloud data of the target point cloud.

Clause 27B. The system of any of clauses 18B-25B, wherein to perform the attribute recomputing process, the processing circuitry is configured to apply a deep learning mechanism to perform the attribute recomputing process.

Clause 28B. The system of any of clauses 18B-27B, wherein the processing circuitry comprises an encoder configured to perform the first encoding process and the second encoding process.

Clause 29B. The system of any of clauses 18B-27B, wherein the processing circuitry comprises a first encoder configured to perform the first encoding process, and a second encoder configured to perform the second encoding process.

Clause 30B. The system of clause 29B, wherein the first encoder is a machine-learning based encoder, and the second encoder is non-machine-learning based encoder.

Clause 31B. The system of clause 29B, wherein the first encoder is a machine-learning based encoder, and the second encoder is a machine-learning based encoder.

Clause 32B. A system for decoding point cloud data, the system comprising: one or more memories configured to store point cloud data; and processing circuitry coupled to the one or more memories and configured to: receive a geometry bitstream including encoded geometry data of the point cloud data that is encoded in accordance with a first encoding process; decode, with a first decoding process that is reciprocal of the first encoding process, the encoded geometry data to generate reconstructed geometry data; receive an attribute bitstream including encoded attribute data of the point cloud data that is encoded in accordance with a second encoding process; and decode, with a second decoding process that is reciprocal of the second encoding process and based on the reconstructed geometry data, the encoded attribute data to generate decoded attribute data and reconstructed geometry data of the point cloud data.

Clause 33B. The system of clause 32B, wherein the first decoding process comprises a deep learning-based geometry decoding process.

Clause 34B. The system of any of clauses 32B and 33B, wherein the second decoding process comprises a lossy attribute decoding process.

Clause 35B. The system of any of clauses 32B and 33B, wherein the second decoding process comprises a deep learning decoding process.

Clause 36B. The system of any of clauses 32B and 33B, wherein the second decoding process comprises a video point cloud compression (V-PCC) decoding process.

Clause 37B. The system of any of clauses 32B-36B, wherein the first decoding process and the second decoding process are different decoding processes.

Clause 38B. The system of any of clauses 32B-37B, wherein the first and second decoding processes are two of a plurality of decoding processes, and wherein the processing circuitry is configured to: receive information indicating that the first and second decoding processes of the plurality of decoding processes is to be used for decoding.

Clause 39B. The system of any of clauses 32B-38B, wherein the processing circuitry comprises a decoder configured to perform the first decoding process and the second decoding process.

Clause 40B. The system of any of clauses 32B-38B, wherein the wherein the processing circuitry comprises a first decoder configured to perform the first decoding process, and a second decoder configured to perform the second decoding process.

Clause 41B. The system of clause 40B, wherein the first decoder is a machine-learning based decoder, and the second decoder is non-machine-learning based decoder.

Clause 42B. The system of clause 40B, wherein the first decoder is a machine-learning based decoder, and the second encoder is a machine-learning based decoder.

Clause 43B. A computer-readable storage medium storing instructions thereon that when executed cause one or more processors to: receive, for a first encoding process, geometry data of the point cloud data of a source point cloud; encode, in accordance with the first encoding process, the geometry data to generate encoded geometry data of a target point cloud and a geometry bitstream; decode the encoded geometry data to generate reconstructed geometry data; perform an attribute recomputing process on attribute data of the point cloud data of the source point cloud based on the reconstructed geometry data to generate recomputed, reconstructed point cloud data of the target point cloud; and encode, in accordance with a second encoding process, the recomputed, reconstructed point cloud data to generate an attribute bitstream.

Clause 44B. A computer-readable storage medium storing instructions thereon that when executed cause one or more processors to: receive a geometry bitstream including encoded geometry data of the point cloud data that is encoded in accordance with a first encoding process; decode, with a first decoding process that is reciprocal of the first encoding process, the encoded geometry data to generate reconstructed geometry data; receive an attribute bitstream including encoded attribute data of the point cloud data that is encoded in accordance with a second encoding process; and decode, with a second decoding process that is reciprocal of the second encoding process and based on the reconstructed geometry data, the encoded attribute data to generate decoded attribute data and reconstructed geometry data of the point cloud data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
   receiving, for a first encoding process, geometry data of the point cloud data of a source point cloud;
   encoding, in accordance with the first encoding process, the geometry data to generate encoded geometry data and a geometry bitstream;
   decoding the encoded geometry data to generate reconstructed geometry data for a target point cloud;
   performing an attribute recomputing process on attribute data of the point cloud data of the source point cloud based on the reconstructed geometry data to generate recomputed, reconstructed point cloud data of the target point cloud; and
   encoding, in accordance with a second encoding process, the recomputed, reconstructed point cloud data to generate an attribute bitstream.

2. The method of claim 1, wherein the first encoding process comprises a deep learning-based geometry encoding process.

3. The method of claim 1, wherein the second encoding process comprises a lossy attribute encoding process.

4. The method of claim 1, wherein the second encoding process comprises a deep learning encoding process.

5. The method of claim 1, wherein the second encoding process comprises a video point cloud compression (V-PCC) encoding process.

6. The method of claim 1, wherein the first encoding process and the second encoding process are different encoding processes.

7. The method of claim 1, wherein performing the attribute recomputing process comprises performing a re-coloring process on the attribute data, wherein the recomputed, reconstructed point cloud data comprises re-colored, reconstructed point cloud data, and wherein encoding the recomputed, reconstructed point cloud data comprises encoding the re-colored, reconstructed point cloud data to generate the attribute bitstream.

8. The method of claim 7, wherein the re-coloring process comprises a weighted distance based nearest neighbor search-based re-coloring process.

9. The method of claim 1, wherein performing the attribute recomputing process comprises:

receiving the reconstructed geometry data for a first point of the target point cloud;

determining a plurality of points in the point cloud data of the source point cloud that are proximate to the first point of the target point cloud based on the reconstructed geometry data;

determining attribute data for the plurality of points in the point cloud data of the source point cloud; and determining attribute data for the first point in the target point cloud based on the attribute data for the plurality of points of the source point cloud to generate the recomputed, reconstructed point cloud data of the target point cloud.

10. The method of claim 1, wherein performing the attribute recomputing process comprises applying a deep learning mechanism to perform the attribute recomputing process.

11. A method of decoding point cloud data, the method comprising:

receiving a geometry bitstream including encoded geometry data of the point cloud data that is encoded in accordance with a first encoding process;

decoding, with a first decoding process that is reciprocal of the first encoding process, the encoded geometry data to generate first reconstructed geometry data;

receiving an attribute bitstream including encoded attribute data of the point cloud data that is encoded in accordance with a second encoding process; and decoding, with a second decoding process that is reciprocal of the second encoding process and with the first reconstructed geometry data as input, the encoded attribute data to generate decoded attribute data of the point cloud data and second reconstructed geometry data, the second reconstructed geometry data being reconstructed geometry data of the point cloud data.

12. The method of claim 11, wherein the first decoding process comprises a deep learning-based geometry decoding process.

13. The method of claim 11, wherein the second decoding process comprises a lossy attribute decoding process.

14. The method of claim 11, wherein the second decoding process comprises a deep learning decoding process.

15. The method of claim 11, wherein the second decoding process comprises a video point cloud compression (V-PCC) decoding process.

16. The method of claim 11, wherein the first decoding process and the second decoding process are different decoding processes.

17. The method of claim 11, wherein the first and second decoding processes are two of a plurality of decoding processes, the method further comprising:

receiving information indicating that the first and second decoding processes of the plurality of decoding processes is to be used for decoding.

18. A system for encoding point cloud data, the system comprising:

one or more memories configured to store point cloud data; and processing circuitry coupled to the one or more memories and configured to:

receive, for a first encoding process, geometry data of the point cloud data of a source point cloud;

encode, in accordance with the first encoding process, the geometry data to generate encoded geometry data and a geometry bitstream;

decode the encoded geometry data to generate reconstructed geometry data for a target point cloud;

perform an attribute recomputing process on attribute data of the point cloud data of the source point cloud based on the reconstructed geometry data to generate recomputed, reconstructed point cloud data of the target point cloud; and encode, in accordance with a second encoding process, the recomputed, reconstructed point cloud data to generate an attribute bitstream.

19. The system of claim 18, wherein the first encoding process comprises a deep learning-based geometry encoding process.

20. The system of claim 18, wherein the second encoding process comprises a lossy attribute encoding process.

21. The system of claim 18, wherein the second encoding process comprises a deep learning encoding process.

22. The system of claim 18, wherein the second encoding process comprises a video point cloud compression (V-PCC) encoding process.

23. The system of claim 18, wherein the first encoding process and the second encoding process are different encoding processes.

24. The system of claim 18, wherein to perform the attribute recomputing process, the processing circuitry is configured to perform a re-coloring process on the attribute data, wherein the recomputed, reconstructed point cloud data comprises re-colored, reconstructed point cloud data, and wherein to encode the recomputed, reconstructed point cloud data, the processing circuitry is configured to encode the re-colored, reconstructed point cloud data to generate the attribute bitstream.

25. The system of claim 24, wherein the re-coloring process comprises a weighted distance based nearest neighbor search-based re-coloring process.

26. The system of claim 18, wherein to perform the attribute recomputing process, the processing circuitry is configured to:

receive the reconstructed geometry data for a first point of the target point cloud;

determine a plurality of points in the point cloud data of the source point cloud that are proximate to the first point of the target point cloud based on the reconstructed geometry data;

determine attribute data for the plurality of points in the point cloud data of the source point cloud;

determine attribute data for the first point in the target point cloud based on the attribute data for the plurality of points of the source point cloud; and assign the attribute data for the first point of the target point cloud to generate the recomputed, reconstructed point cloud data of the target point cloud.

27. The system of claim 18, wherein to perform the attribute recomputing process, the processing circuitry is configured to apply a deep learning mechanism to perform the attribute recomputing process.

28. The system of claim 18, wherein the processing circuitry comprises an encoder configured to perform the first encoding process and the second encoding process.

29. The system of claim 18, wherein the processing circuitry comprises a first encoder configured to perform the first encoding process, and a second encoder configured to perform the second encoding process.

30. The system of claim 29, wherein the first encoder is a machine-learning based encoder, and the second encoder is non-machine-learning based encoder.

31. The system of claim 29, wherein the first encoder is a machine-learning based encoder, and the second encoder is a machine-learning based encoder.

32. A system for decoding point cloud data, the system comprising:
  one or more memories configured to store point cloud data; and
  processing circuitry coupled to the one or more memories and configured to:
    receive a geometry bitstream including encoded geometry data of the point cloud data that is encoded in accordance with a first encoding process;
    decode, with a first decoding process that is reciprocal of the first encoding process, the encoded geometry data to generate first reconstructed geometry data;
    receive an attribute bitstream including encoded attribute data of the point cloud data that is encoded in accordance with a second encoding process; and
    decode, with a second decoding process that is reciprocal of the second encoding process and with the reconstructed geometry data as input, the encoded attribute data to generate decoded attribute data of the point cloud data and second reconstructed geometry data, the second reconstructed geometry data being reconstructed geometry data of the point cloud data.

33. The system of claim 32, wherein the first decoding process comprises a deep learning-based geometry decoding process.

34. The system of claim 32, wherein the second decoding process comprises a lossy attribute decoding process.

35. The system of claim 32, wherein the second decoding process comprises a deep learning decoding process.

36. The system of claim 32, wherein the second decoding process comprises a video point cloud compression (V-PCC) decoding process.

37. The system of claim 32, wherein the first decoding process and the second decoding process are different decoding processes.

38. The system of claim 32, wherein the first and second decoding processes are two of a plurality of decoding processes, and wherein the processing circuitry is configured to:

receive information indicating that the first and second decoding processes of the plurality of decoding processes is to be used for decoding.

39. The system of claim 32, wherein the processing circuitry comprises a decoder configured to perform the first decoding process and the second decoding process.

40. The system of claim 32, wherein the wherein the processing circuitry comprises a first decoder configured to perform the first decoding process, and a second decoder configured to perform the second decoding process.

41. The system of claim 40, wherein the first decoder is a machine-learning based decoder, and the second decoder is non-machine-learning based decoder.

42. The system of claim 40, wherein the first decoder is a machine-learning based decoder, and the second decoder is a machine-learning based decoder.

43. A non-transitory computer-readable storage medium storing instructions thereon that when executed cause one or more processors to:
  receive, for a first encoding process, geometry data of the point cloud data of a source point cloud;
  encode, in accordance with the first encoding process, the geometry data to generate encoded geometry data of a target point cloud and a geometry bitstream;
  decode the encoded geometry data to generate reconstructed geometry data;
  perform an attribute recomputing process on attribute data of the point cloud data of the source point cloud based on the reconstructed geometry data to generate recomputed, reconstructed point cloud data of the target point cloud; and
  encode, in accordance with a second encoding process, the recomputed, reconstructed point cloud data to generate an attribute bitstream.

44. A non-transitory computer-readable storage medium storing instructions thereon that when executed cause one or more processors to:
  receive a geometry bitstream including encoded geometry data of the point cloud data that is encoded in accordance with a first encoding process;
  decode, with a first decoding process that is reciprocal of the first encoding process, the encoded geometry data to generate first reconstructed geometry data;
  receive an attribute bitstream including encoded attribute data of the point cloud data that is encoded in accordance with a second encoding process; and
  decode, with a second decoding process that is reciprocal of the second encoding process and with the first reconstructed geometry data as input, the encoded attribute data to generate decoded attribute data of the point cloud data and second reconstructed geometry data of the point cloud data, the second reconstructed geometry data being reconstructed geometry data.

* * * * *